(12) United States Patent
Mukherjee et al.

(10) Patent No.: US 10,531,310 B2
(45) Date of Patent: *Jan. 7, 2020

(54) PROVIDING SECONDARY COVERAGE IN A MOBILE COMMUNICATION SYSTEM

(71) Applicant: BlackBerry Limited, Waterloo (CA)

(72) Inventors: Biswaroop Mukherjee, Stittsville (CA); Jack Anthony Smith, Irving, TX (US); Masoud Ebrahimi Tazeh Mahalleh, Ottawa (CA); William Anthony Gage, Stittsville (CA); Robert Novak, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,641

(22) Filed: Aug. 27, 2018

(65) Prior Publication Data

US 2018/0368003 A1      Dec. 20, 2018

Related U.S. Application Data

(63) Continuation of application No. 15/389,792, filed on Dec. 23, 2016, now Pat. No. 10,064,068, which is a
(Continued)

(51) Int. Cl.
*H04W 16/26* (2009.01)
*H04W 8/00* (2009.01)
(Continued)

(52) U.S. Cl.
CPC .......... *H04W 16/26* (2013.01); *H04L 5/0048* (2013.01); *H04W 8/005* (2013.01);
(Continued)

(58) Field of Classification Search
CPC ... H04B 7/14; H04B 7/15507; H04B 7/15542
See application file for complete search history.

(56) References Cited

U.S. PATENT DOCUMENTS

| 8,385,926 B2 | 2/2013 | Johansson et al. |
| 8,688,112 B2 * | 4/2014 | Shen .................... H04J 11/0093 370/208 |

(Continued)

FOREIGN PATENT DOCUMENTS

| WO | 2010059856 | 5/2010 |
| WO | 2013031324 | 3/2013 |

OTHER PUBLICATIONS

Office Action issued in U.S. Appl. No. 15/389,792 dated Oct. 27, 2017; 20 pages.
(Continued)

*Primary Examiner* — Phirin Sam
*Assistant Examiner* — Debebe A Asefa
(74) *Attorney, Agent, or Firm* — Fish & Richardson P.C.

(57) ABSTRACT

Example methods, apparatus, articles of manufacture and systems for providing secondary coverage in a mobile communication system are disclosed. Example methods for a first device to provide secondary coverage in a mobile communication system include transmitting a secondary coverage signal and receiving a presence indication from a second device. Such example methods can also include reporting the presence indication to an access node of the mobile communication system. Such example methods can further include receiving information from the access node to enable relay node functionality in the first device in response to reporting the presence indication to the access node.

20 Claims, 15 Drawing Sheets

Related U.S. Application Data continuation of application No. 13/969,192, filed on Aug. 16, 2013, now Pat. No. 9,565,573.

(51) Int. Cl.

| | |
|---|---|
| *H04W 88/04* | (2009.01) |
| *H04L 5/00* | (2006.01) |
| *H04W 56/00* | (2009.01) |
| *H04W 72/04* | (2009.01) |
| *H04W 74/08* | (2009.01) |
| *H04W 76/14* | (2018.01) |
| *H04W 84/04* | (2009.01) |

(52) U.S. Cl.
CPC ..... *H04W 56/001* (2013.01); *H04W 72/0446* (2013.01); *H04W 74/0833* (2013.01); *H04W 88/04* (2013.01); *H04W 76/14* (2018.02); *H04W 84/047* (2013.01)

(56) References Cited

U.S. PATENT DOCUMENTS

| | | | | |
|---|---|---|---|---|
| 8,873,507 | B2* | 10/2014 | Chan | H04W 8/082 370/331 |
| 9,014,110 | B2 | 4/2015 | Montojo et al. | |
| 2003/0123556 | A1* | 7/2003 | Komori | G11B 27/034 375/240.26 |
| 2009/0131084 | A1* | 5/2009 | Comstock | H04B 7/2606 455/458 |
| 2009/0232236 | A1* | 9/2009 | Yamamoto | H04W 52/262 375/260 |
| 2014/0233542 | A1 | 8/2014 | Bergstrom | |
| 2015/0038136 | A1* | 2/2015 | Wu | H04W 48/08 455/434 |
| 2016/0192304 | A1* | 6/2016 | Yi | H04B 7/2656 370/311 |
| 2016/0242170 | A1* | 8/2016 | Xu | H04W 4/70 |

OTHER PUBLICATIONS

3GPP TSG RAN WG1 Meeting #73, "Device Discovery Outside and Partial Network Coverage," R1-132249, LG Electronics, May 20-24, 2013, 3 pages.

3GPP TSG RAN WG1 Meeting #73, "Physical Layer Options for D2D Communication," R1-131865, Huawei, HiSilicon, May 20-24, 2013, 6 pages.

3GPP TSG RAN WG2 Meeting #83, "RAN2 Considerations for Proximity Discovery," R2-132753, Huawei HiSilicon, Aug. 19, 23, 2013, 8 pages.

Communication Pursuant to Rule 164(2)(b) and Article 94(3) EPC issued in European Application No. 14758051.8 dated Oct. 29, 2018, 12 pages.

Notice of Allowance issued in U.S. Appl. No. 15/389,792 dated Apr. 25, 2018, 14 pages.

"3rd Generation Partnership Project; Technical Specification Group Services and System Aspects; Service Requirements for the Evolved Packet System (EPS) (Release 12)," 3GPP TS 22-278 V12.3.0, Jun. 2013 (45 pages).

"3rd Generation Partnership Project; Technical Specification Group Services and Systems Aspects; Feasibility Study for Proximity Services (ProSe) (Release 12)," 3GPP TR 22_803 V12-2.0, Jun. 2013 (45 pages).

"3rd Generation Partnership Project; Technical Specification Group Radio Access Network; Evolved Universal Terrestrial Radio Access (E-UTRA); Physical Layer Procedures (Release 11)," 3GPP TS 36-213 V11.3.0, Jun. 2013 (176 pages).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," 3GPP TS 36.300 V11.3.0, Sep. 2012 (205 pages).

"3rd Generation Partnership Project; Technical Specification Group Radio Access Network; Evolved Universal Terrestrial Radio Access (E-UTRA); Medium Access Control (MAC) Protocol Specification (Release 11 )," 3GPP TS 36.321 V11.3.0, Jun. 2013 (57 pages).

Qualcomm Incorporated, "Study on LTE Device to Device Proximity Services," 3GPP TSG RAN Meeting #58, RP-122009, 3GPP™ Work Item Description, Dec. 2012 (6 pages).

3GPP TSG RAN WG1 Meeting #74, R1-133386, "Enhancements for Efficient Relaying Operations," Barcelona, Spain, Aug. 19-23, 2013, 5 pages.

3GPP TSG RAN WG1 Meeting # 74, R1-13xxxx, Section 6.2.7.3, "D2D Discovery," Barcelona, Spain, Aug. 19-23, 2013, pp. 80-86.

3GPP TSG RAN WG1 Meeting #73; MCC Support, Draft Report, v0.2.0, Barcelona, Spain, Jun. 8, 2013.

International Search Report and Written Opinion in International Application No. PCT/US2014/051100, dated Apr. 8, 2015, 16 pages.

International Preliminary Report on Patentability issued in International Application No. PCT/US2014/051100, dated Feb. 16, 2016; 12 pages.

\* cited by examiner

PROVIDING SECONDARY COVERAGE IN A MOBILE COMMUNICATION SYSTEM

RELATED APPLICATIONS

The present application is a continuation of and claims priority to U.S patent application Ser. No. 15/389,792, filed on Dec. 23, 2016, which is a continuation of and claims priority to U.S patent application Ser. No. 13/969,192, filed on Aug. 16, 2013, which are incorporated by reference in their entireties.

FIELD OF THE DISCLOSURE

This disclosure relates generally to mobile communication systems and, more particularly, to providing secondary coverage in a mobile communication system.

BACKGROUND

Mobile communication systems provide wide spread network coverage in many parts of the world today, and the geographical regions in which user equipment (UE), such as mobile devices, can receive network coverage from access nodes, such as base stations, continues to increase. Such network coverage is referred to herein as primary coverage. However, there are and will continue to be scenarios in which a UE cannot obtain network coverage from any network access node, such as in remote geographic regions, or when network equipment fails due to a natural disaster. Secondary coverage techniques can extend the coverage area of existing (and functional) access nodes by allowing UEs that are not in the coverage area of any network access node to gain access to a network via UEs that are in the coverage area of one or more network access nodes. For example, the Third Generation Partnership Project (3GPP) long term evolution (LTE) standard specifies a secondary coverage technique in which in-coverage UEs can implement relay node functionality to provide network coverage for UEs that are not in the coverage area of any network access node.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
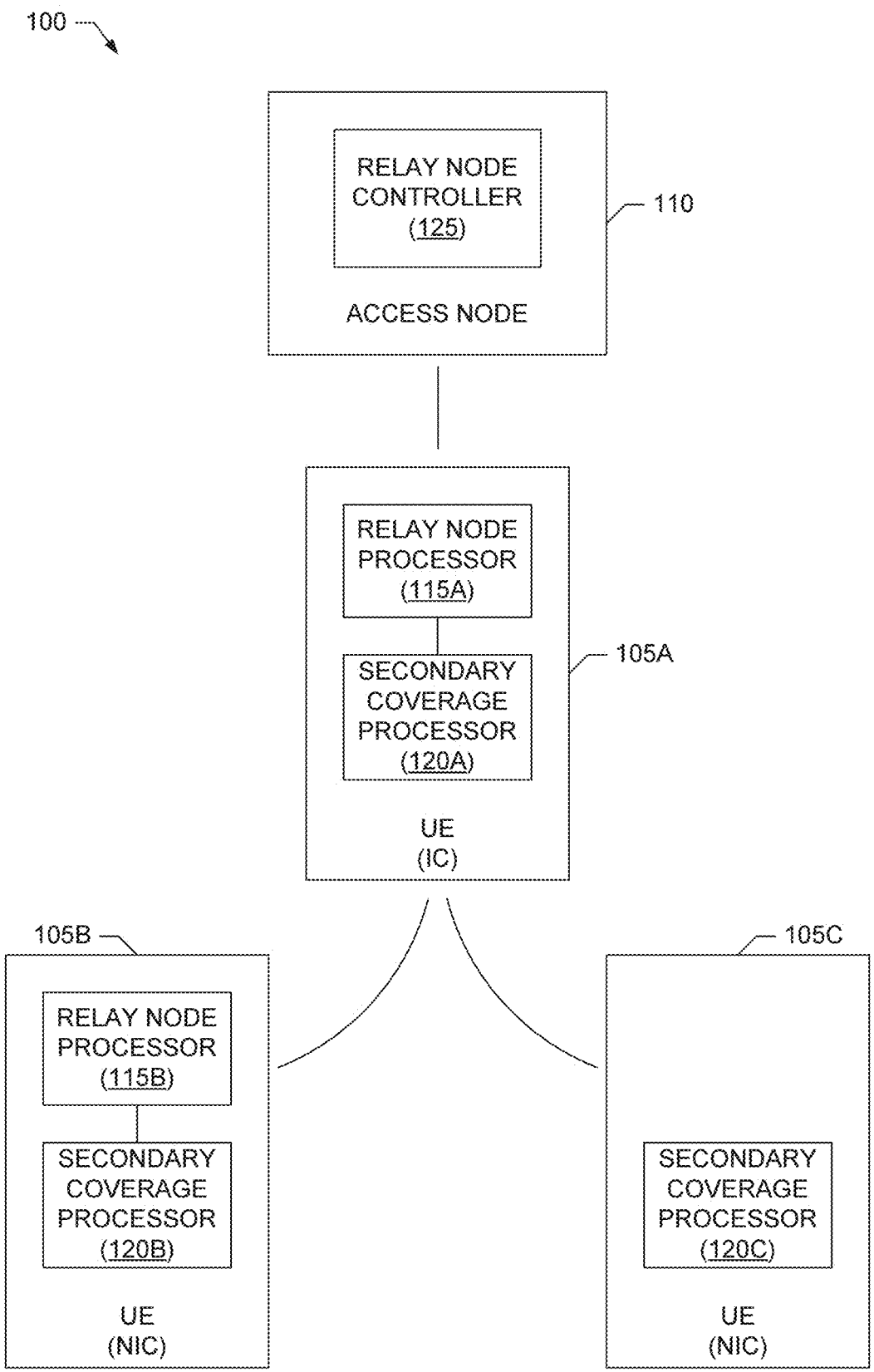
FIG. 1 is a block diagram of an example mobile communication system capable of providing secondary coverage as disclosed herein.

Example methods, apparatus, articles of manufacture and systems for providing secondary coverage in a mobile communication system are disclosed. Example methods disclosed herein include methods for a first device to communicate with a second device in a mobile communication system. Such communication can include, but is not limited to, (1) exchanges of signal(s) from the first device, which may or may not be received by the second device, indicating the presence of the first device, the ability of the first device to provide secondary coverage in the mobile communication system, and/or an opportunity for the second device to transmit signal(s) for receipt by the first device, (2) exchanges of signal(s) from the second device, which may or may not be received by the first device, indicating the presence of the second device and/or a request from the second device for secondary coverage in the mobile communication system, etc., and/or any other type of communication exchange. For example, such methods can include the first device transmitting a first signal indicating an opportunity for the second device to transmit a second signal. In such examples, the first device has primary coverage from a first access node of the mobile communication system, whereas the second device does not have primary coverage from any access node of the mobile communication system. Such example methods can further include the first device receiving a second signal from the second device.

Some such example methods can also include relaying information between the second device and the first access node in response to receiving the second signal. Moreover, the information can be first information, and some such example methods can further comprising receiving second information from the first access node to enable relay node functionality in the first device. In some such examples, the second information received from the first access node causes the first device to stop transmitting the first signal and to start broadcasting a synchronization signal and system information to provide secondary coverage to the second device. Additionally or alternatively, some such example methods can include reporting a presence of the second device to the first access node, such that the second information is received after the reporting of the presence of the second device to the first access node In some such example methods, the first signal is a secondary coverage signal indicating that the first device is able to provide secondary coverage in the mobile communication system. For example, the mobile communication system can support long term evolution (LTE) functionality, and the secondary coverage signal can include a reference signal transmitted in a center number of resource blocks of an uplink subframe. In some such examples, the center number is six (6), and the reference signal transmits a length-62 Zadoff-Chu sequence. Additionally or alternatively, in some such examples, the secondary coverage signal is a first secondary coverage signal indicating that the first device is able to provide secondary coverage in the mobile communication system, and the example methods further include transmitting a second secondary coverage signal that is to indicate timing associated with when the first device expects to receive the second signal.

Additionally or alternatively, in some such example methods, the second signal includes a presence indication that indicates the second device is requesting secondary coverage in the mobile communication system. For example, the presence indication can correspond to a physical random access channel (PRACH) transmission received by the first device from the second device. Furthermore, some such example methods include reporting the presence indication to the first access node. For example, reporting the presence indication to the access node can be performed by including an information element indicating receipt of a preamble representing the presence indication in a measurement report, and transmitting the measurement report to the access node.

Additionally or alternatively, some such example methods can include receiving information from the access node to configure the first signal.

Example methods disclosed herein for a first device to obtain secondary coverage in a mobile communication system include receiving a secondary coverage signal from a second device. Such example methods can also include transmitting a presence indication in response to receiving the secondary coverage signal from the second device. Such example methods can further include obtaining secondary coverage from the second device after transmitting the presence indication.

In some such example methods, the mobile communication system supports LTE functionality, and the secondary coverage signal comprises a reference signal transmitted in a center number of resource blocks of an uplink subframe. For example, the center number can be six (6), and the reference signal can transmit a length-62 Zadoff-Chu sequence.

Additionally or alternatively, in some such example methods, the secondary coverage signal is a first secondary coverage signal indicating that the second device is able to provide secondary coverage in the mobile communication system, and the example methods further include receiving a second secondary coverage signal from the second device that is to indicate timing associated with when the second device expects to receive the presence indication.

Additionally or alternatively, in some such example methods, the presence indication corresponds to a PRACH transmission transmitted by the first device.

Additionally or alternatively, in some such example methods, obtaining secondary coverage from the second device includes receiving a synchronization signal and system information broadcast by the second device after transmitting the presence indication.

Example methods disclosed herein for an access node to configure secondary coverage in a mobile communication system include configuring a first device to transmit a secondary coverage signal. In such examples, the first device is connected to the access node. Such example methods can also include receiving a message from the first device reporting that a presence indication has been received by the first device from a second device. Such example methods can further include configuring the first device to enable relay node functionality in the first device in response to receiving the message reporting the presence indication.

In some such example methods, configuring the first device to transmit the secondary coverage signal includes transmitting information to the first device. For example, if the first device was functioning as user equipment, the first information can cause the first device to transmit the secondary coverage signal in addition to continuing to implement its existing user equipment function. However, if the user equipment was already operating as a relay node, the first information can cause the first device to disable the relay node functionality in the first device and to start transmitting the secondary coverage signal. For example, the information can include a parameter of the secondary coverage signal and/or a trigger for the same.

Additionally or alternatively, some such example methods further include configuring the first device to transmit a second type of signal that is to indicate resources to be used for sending presence indications, the resources including timing associated with when the first device expects to receive the presence indication.

Additionally or alternatively, in some such example methods, the mobile communication system supports LTE functionality, the presence indication corresponds to a PRACH transmission received by the first device from the second device, and receiving the message from the first device includes receiving a measurement report from the first device. In some such examples, the measurement report includes an information element indicating that the first device received a preamble representing the presence indication.

Additionally or alternatively, in some such example methods, configuring the first device to enable relay node functionality includes transmitting information to the first device to cause the first device to stop transmitting the secondary coverage signal and to initiate the relay node functionality. For example, the information can include a cell identifier and/or system information to be broadcast by the first device.

These and other example methods, apparatus, systems and articles of manufacture (e.g., physical storage media) for providing secondary coverage in a mobile communication system are disclosed in greater detail below.

Secondary coverage in the context of a mobile communication system refers to extending the primary coverage provided by the existing access nodes (e.g., base stations, such as enhanced Node-Bs or eNBs) to devices (e.g., UEs) that are outside the primary coverage area (or are otherwise unable to obtain service in the primary coverage area) via devices (e.g., UEs) that are in the primary coverage area. For example, in partial coverage scenarios, one or more devices, referred to as in-coverage devices, are in the network's primary coverage area, whereas one or more other devices, referred to as not-in-coverage devices, are not in the network's primary coverage area. However, one or more of the not-in-coverage devices may be within range of one or more of the in-coverage devices.

The secondary coverage functionality disclosed herein can solve the problem of a lack of mechanisms for efficiently enabling secondary coverage in existing mobile communication systems, such as existing LTE systems. For example, secondary coverage functionality as disclosed herein can cause in-coverage devices to enable relay node functionality to provide secondary coverage by relaying information from access node(s) to not-in-coverage devices in a manner that does not cause excessive interference and/or power consumption. Furthermore, secondary coverage functionality as disclosed herein can provide mechanisms to indicate the possibility of secondary coverage to a not-in-coverage device, without having to speculatively and/or statically enable full relay node functionality in one or more of the in-coverage devices.

In the following, the acronym IC represents the phrase "in-coverage" and the acronym NIC represents the phrase "not-in-coverage."

Turning to the figures, a block diagram of an example mobile communication system 100 capable of providing secondary coverage as disclosed herein is illustrated in FIG. 1. In the illustrated example, the mobile communication system 100 corresponds to an LTE mobile communication system and includes a first example UE 105 in communication with an example eNB 110 or, more generally, an example access node 110. The first UE 105A of the illustrated example is in the primary coverage area of the eNB 110 and is able to obtain network access from the eNB 110. Thus, the first UE 105A is said to be in-coverage because the first UE 105A is obtaining primary coverage from the eNB 110 or, in other words, is camped on the eNB 110 such that the UE 105A is able to receive synchronization signal(s) and/or system information from the eNB 110. Accordingly, such a UE is referred to herein as an in-coverage device (ICD) and, as such, the UE 105A is also referred to herein as the ICD 105A. Because the UE 105A is in primary coverage area of the eNB 110, the UE 105A is able to receive information from the eNB 110 over one or more downlink (DL) channels, and is able to transmit information to the eNB 110 over one or more uplink (UL) channels.

The example system of FIG. 1 also includes second and third example UEs 105B and 105C, which are not in the coverage area of the eNB 110 and, thus, are unable to obtain network access from the eNB 110. Furthermore, the UEs 105B and 105C are assumed to be not-in-coverage because the UEs 105B and 105C are assumed to not be obtaining primary coverage from any eNB or other access node(s) of the system 100. In other words, the UEs 105B and 105C are not camped and are unable to receive synchronization signal(s) and/or system information transmitted by any access node of the system 100. Accordingly, such UEs are referred to herein as not-in-coverage devices (NICDs) and, as such, the UEs 105B and 105C are also referred to herein as the NICD 105B and NICD 105C, respectively. However, in the illustrated example of FIG. 1, one or both of the UEs 105B and 105C are in communication range of the UE 105A and, thus, are able to obtain network access via the in-coverage UE 105A in accordance with the example secondary coverage functionality disclosed herein.

For example, the in-coverage UE 105A of FIG. 1 includes an example relay node processor 115A to implement relay node functionality for providing secondary coverage to one or more of the not-in-coverage UEs 105B-C. The relay node processor 115A of the illustrated example can implement any type and/or combination of relay node functionality, such as relay node functionality compliant with the 3GPP LTE specifications. As such, the relay node processor 115A may configure or otherwise cause the in-coverage UE 105A to broadcast one or more signals, such as one or more synchronization signals, one or more channels containing system information, etc., which the not-in-coverage UEs 105B-C may receive and use to camp on the in-coverage UE 105A. Furthermore, the relay node processor 115A may configure or otherwise cause the in-coverage UE 105A to receive one or more uplink signals and/or channels from the not-in-coverage UEs 105B-C, which may contain information to be used to register the not-in-coverage UEs 105B-C with the eNB 110 and/or a network served or otherwise accessible via the eNB 110.

Figure 2:
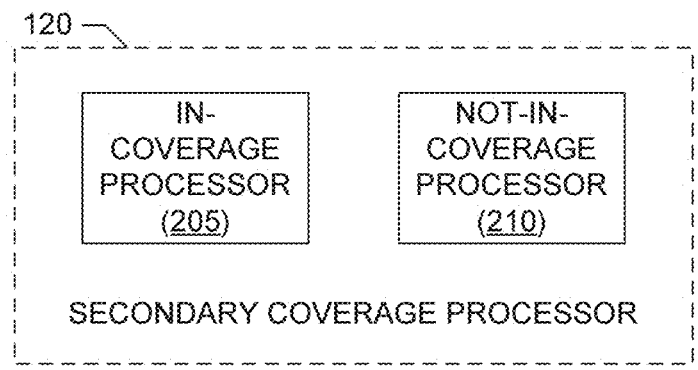
FIG. 2 is a block diagram of an example secondary coverage processor that can be used to implement one or more of the example UEs included in the example system of FIG. 1.

In the illustrated example of FIG. 1, the in-coverage UE 105A and the not-in-coverage UEs 105B-C include respective example secondary coverage processors 120A-C to implement secondary coverage functionality as disclosed herein. In some examples, the eNB 110 includes an example relay node controller 125 that also implements secondary coverage functionality as disclosed herein. The secondary coverage processors 120A-C and the relay node controller 125 implement functionality to, in part, determine when and/or under what circumstances relay node functionality is to be enabled in ICDs, such as the in-coverage UE 105A. FIG. 2 illustrates an example secondary coverage processor 120, which may be used to implement one or more of the secondary coverage processors 120A-C of FIG. 1. In the illustrated example of FIG. 2, the secondary coverage processor 120 includes an example in-coverage processor 205 and an example not-in-coverage processor 210. Example implementations and operations of the secondary coverage processors 120 and 120A-C, the relay node controller 125, the in-coverage processor 205 and the not-in-coverage processor 210 are described in greater detail below.

The example UEs 105A-C of FIG. 1 can be implemented by any types and/or combination of user devices, mobile stations, user endpoint equipment, etc., such as smartphones, mobile telephone devices that are portable, mobile telephone devices implementing stationary telephones, personal digital assistants (PDAs), etc., or, for example, any other types of UE devices, or combinations thereof. Also, one or more of the UEs 105A-C may correspond to other types of devices capable of operating in the system 100. For examples, one or more of the UEs 105A-C may correspond to a relay node, a small cell (e.g., in a cell cluster), a micro/pico/femto cell, etc. Thus, the secondary coverage processors 120A-C can be included in any such devices to implement secondary coverage functionality, and in-coverage and/or not-in-coverage processing, as disclosed herein. Accordingly, the term "device" is used herein in a general sense to refer to any type of equipment capable of implementing the example secondary coverage techniques disclosed herein.

Furthermore, although three UEs 105A-C and one eNB 110 are illustrated in FIG. 1, the example system 100 can support any number and/or type(s) of UE devices and/or eNBs. Also, one or more of the not-in-coverage UEs may include relay node functionality similar or identical to one or more of the in-coverage UEs, such as the example non-in-coverage UE 105B, which includes an example relay node processor 115B that may be similar to the relay node processor 115A of the in-coverage UE 105A (although the relay node processor 115B may not enable relay node functionality in the UE 105B until the UE 105B is in a primary coverage area, such as within the coverage are of the eNB 110). However, other UEs, such as the UE 105C, may not support relay node functionality and, as such, may not include a relay node processor, such as the relay node processor 115A-B. Moreover, the example system 100 may support other communication standards and/or functionality in addition to LTE mobile communications. Accordingly, in such systems, the eNB(s) 110 can correspond to any type(s) and/or number of access node(s), base station(s), etc., and the UEs 105A-C can correspond to any type(s) and/or number of UEs, etc., supporting such communication standards and/or functionality. Therefore, the example methods, apparatus, articles of manufacture and systems disclosed herein for providing secondary coverage in a mobile communication system are not limited to implementation in an LTE system, but can be applied in any system supporting the relay of information among devices to, for example, control how such information relaying is initiated.

Figure 3:
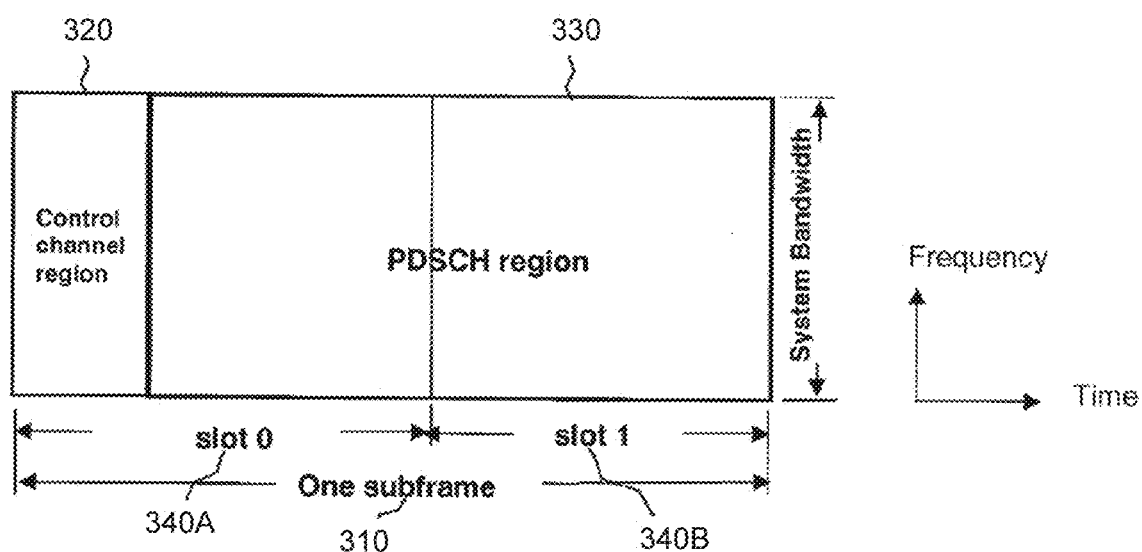
FIG. 3 illustrates an example downlink LTE subframe supported by the example system of FIG. 1.

FIG. 3 illustrates an example DL LTE subframe 310 that can be supported by the example system 100 of FIG. 1. Control information is transmitted in a control channel region 320 and may include a physical control format indicator channel (PCFICH), a physical hybrid automatic repeat request (HARQ) indicator channel (PHICH), and a physical downlink control channel (PDCCH). The control channel region 320 includes the first few OFDM (orthogonal frequency division multiplexing) symbols in the subframe 310. The number of OFDM symbols for the control channel region 320 is either dynamically indicated by PCFICH, which is transmitted in the first symbol, or semi-statically configured, for example, in the case of carrier aggregation.

Also referring to FIG. 3, a physical downlink shared channel (PDSCH), a physical broadcast channel (PBCH), a primary synchronization channel/secondary synchronization channel (PSC/SSC), and a channel state information reference signal (CSI-RS) are transmitted in a PDSCH region 330 of the subframe 310. DL user data is carried by the PDSCH channels scheduled in the PDSCH region 330. Cell-specific reference signals are transmitted over both the control channel region 320 and the PDSCH region 330.

The PDSCH is used in LTE to transmit DL data to a UE. The PDCCH and the PDSCH are transmitted in different time-frequency resources in a LTE subframe as shown in FIG. 3. Different PDCCHs can be multiplexed in the PDCCH region 220, while different PDSCHs can be multiplexed in the PDSCH region 330.

In a frequency division duplex system, a radio frame includes ten subframes of one millisecond each. A subframe 310 includes two slots in time and a number of resource blocks (RBs) in frequency as shown in FIG. 3. The number of RBs is determined by the system bandwidth. For example, the number of RBs is 50 for a 10 megahertz system bandwidth.

An OFDM symbol in time and a subcarrier in frequency together define a resource element (RE). A physical RB (PRB) can be defined as, for example, 12 consecutive subcarriers in the frequency domain and all the OFDM symbols in a slot in the time domain. An RB pair with the same RB index in slot 0 (represented by reference numeral 340A in FIG. 3) and slot 1 (represented by reference numeral 340B in FIG. 3) in a subframe can be allocated together to the same UE for its PDSCH.

Figure 4:
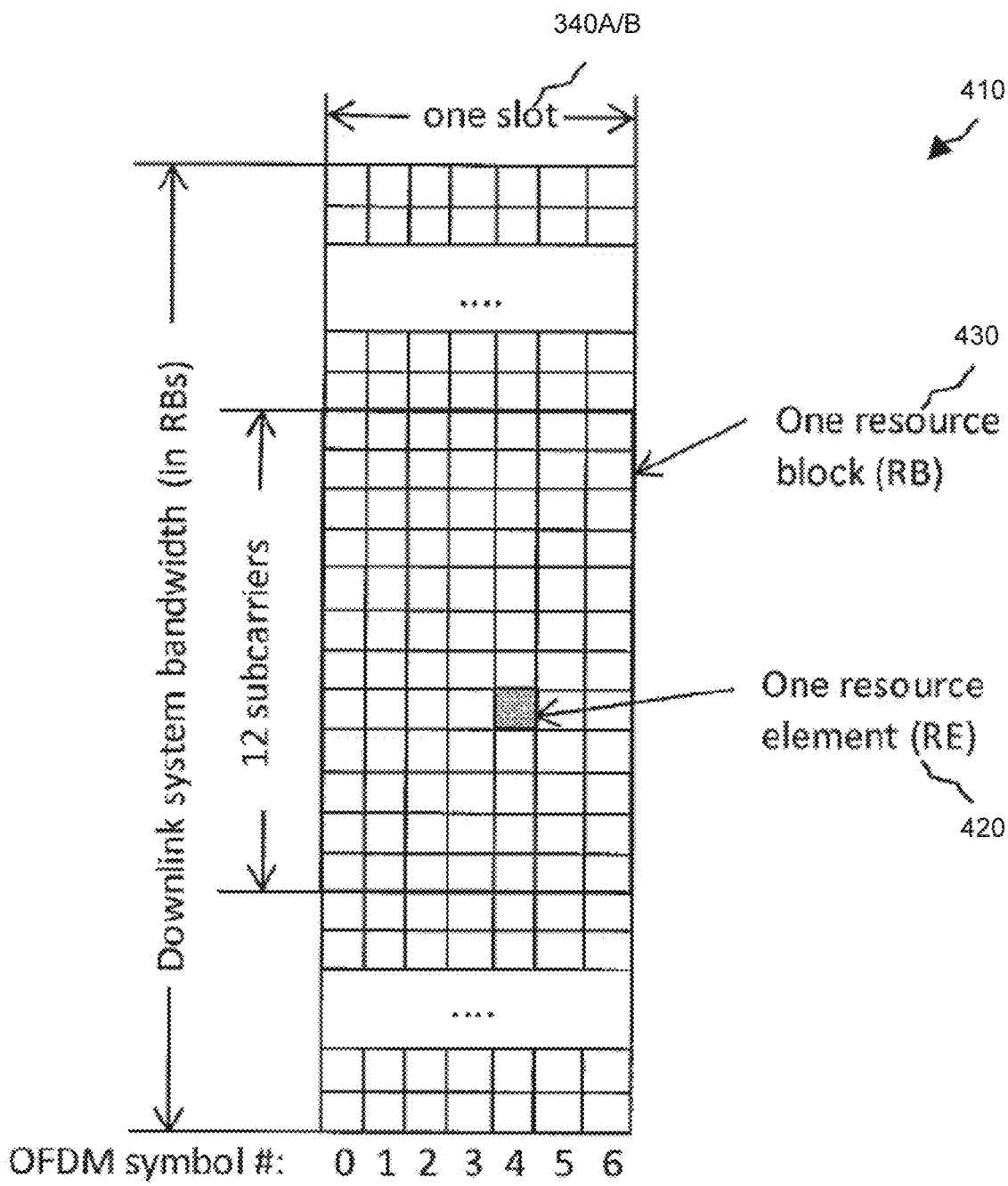
FIG. 4 illustrates an example LTE downlink resource grid supported by the example system of FIG. 1.

In an LTE system, such as the example system 100, one or more transmit antennas can be supported at the eNB for DL transmissions. Each antenna port can have a resource grid as illustrated in the example of FIG. 4. As shown in FIG. 4, a DL slot includes seven OFDM symbols in the case of a normal cyclic prefix configuration. A DL slot can include six OFDM symbols in the case of an extended cyclic prefix configuration. To simplify the following discussion, subframes with the normal cyclic prefix configuration will be considered hereinafter, but it should be understood that similar concepts are applicable to subframes with an extended cyclic prefix.

FIG. 4 shows an example LTE DL resource grid 410 within each slot 340A/B in the case of a normal cyclic prefix configuration. The resource grid 410 is defined for each antenna port or, in other words, each antenna port has its own separate resource grid 410. Each element in the resource grid 410 for an antenna port corresponds to a respective RE 420, which is uniquely identified by an index pair of a subcarrier and an OFDM symbol in a slot 340A/B. An RB 430 includes a number of consecutive subcarriers in the frequency domain and a number of consecutive OFDM symbols in the time domain, as shown in FIG. 4. An RB 430 is the basic unit used for the mapping of certain physical channels to REs 420.

Similar LTE subframe and resource grid arrangements are used for UL communication in the direction from UE(s), such as one or more of the UEs 105A-C, to eNB(s), such as the eNB 110. One such UL communication is a sounding reference signal (SRS), which may be transmitted by a UE and used by a receiving eNB to estimate UL channel quality. Another such UL communication is a physical random access channel (PRACH) in which a UE transmits preambles to gain access to a receiving eNB. Further UL communications from a UE to an eNB may include, but are not limited to, a physical uplink shared channel (PUSCH) and a physical uplink control channel (PUCCH).

Returning to FIG. 1, the example system 100 supports secondary coverage to extend the primary coverage provided by the existing access nodes (e.g., the eNB 110) to devices (e.g., the UEs 105B and/or 105C) that are outside the primary coverage area (or are otherwise unable to obtain service in the primary coverage area) via devices (e.g., the UE 105A) that are in the primary coverage area. Although mobile communication systems such as the system 100 provide wide spread network coverage in many parts of the world via access nodes (e.g., base stations, eNBs, etc.) implementing primary coverage areas, there are and will continue to be scenarios in which a UE cannot obtain network coverage from any network access node. For example, in emergency scenarios, one or more access nodes may fail in some areas, preventing UEs in those areas from obtaining primary network coverage. Secondary coverage functionality can enable emergency workers in those areas to connect to the network.

Figure 5:
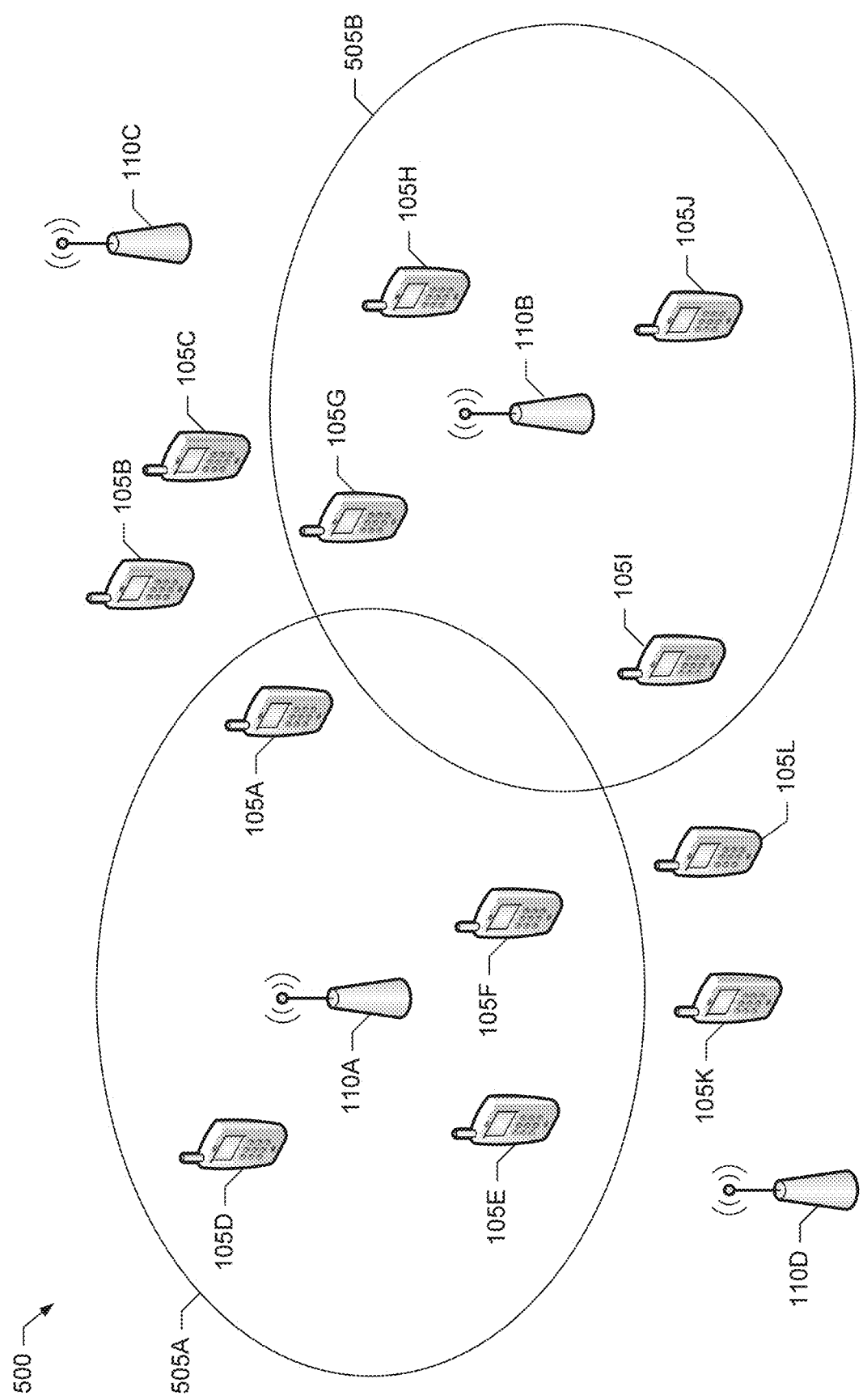
FIG. 5 is a block diagram illustrating an example secondary coverage scenario that can be supported by the example system of FIG. 1.

Such an example scenario 500 in which secondary coverage functionality could be used to enable not-in-coverage devices to still obtain network access is illustrated in FIG. 5.

The example scenario 500 corresponds to an example implementation of the system 100 in which four example eNBs 110A-D provide primary coverage for example UEs 105A-L. However, in the illustrated example scenario 500, the two eNBs 110C-D have failed or are otherwise not providing primary network coverage. In such an example, secondary coverage functionality as disclosed herein can be used to provide one or more of the not-in-coverage UEs 105B, C, K and/or L, which would have be in the primary coverage areas of the eNBs 110C-D, with indirect access to one or more of the eNBs A-B still providing example primary network coverage areas 505A and 505B.

In existing LTE systems, primary network coverage is provided by eNBs. An initial step in obtaining primary coverage is the synchronization process, which starts with a UE detecting the primary synchronization sequence (PSS) broadcast by an eNB in its PSC. The PSS is transmitted on the middle 6 RBs of the PSC, and it occupies a single symbol in the time domain sent twice in a radio frame of 20 timeslots. The PSS is implemented by a length 62 Zadoff-Chu sequence, which is mapped to the 31 subcarriers on each side of a downlink direct current (DC) subcarrier, with the remaining subcarriers within the 6 RB band being left unused. The PSS can not only be used for symbol time acquisition, but also for carrier frequency synchronization. In some scenarios, the eNB may also broadcast a secondary synchronization sequence (SSS) in an SSC.

LTE relay node (RN) functionality has been specified in LTE Release 10, to enable not-in-coverage UEs or, equivalently, not-in-coverage devices (NICDs) to connect to the network via RNs. Like an eNB, an RN sends a PSS (and possibly an SSS), and has its own cell identifier to allow a not-in-coverage UE to connect to the network. RNs are configured by a home subscriber server (HSS) to allow a donor eNB to know that the device is allowed to act as a RN. (An HSS can be, for example, a network node containing subscription-related information to support handling calls and communications sessions.) The RNs start by connecting to a donor eNB to obtain suitable configuration, and then switch over to RN operation.

While the current LTE specifications contemplate RN functionality being implemented by ICDs to provide network connections for not-in-coverage UEs or, equivalently, NICDs, no mechanisms are available to determine an appropriate set of ICDs to be enabled to operate as RNs to connect to a given set of NICDs. Moreover, because the ICDs and NICDs are mobile, there is unlikely to be an unchanging set of appropriate ICDs that can be statically configured to act as RNs.

One possible approach would be to enable all ICDs to act as RNs. However, there are several disadvantages associated with such an approach. For example, the ICDs, when acting as RNs, transmit system information in the form of, for example, master information blocks (MIBs) and system information blocks (SIBs), which can be used by receiving NICDs to register with a donor eNB serving a particular RN. If all ICDs in a system were to act as RNs, MIBs and SIBs would be transmitted by all such ICD RNs, which may result in inefficient use of system resources because only a small percentage of ICDs may be in the vicinity of NICDs that can take advantage of the RN functionality. Note that the system cost of transmitting MIBs and SIBs, although configurable, may be significant because MIBs and SIBs convey several hundreds of bytes of information at a conservative coding rate.

Another potential disadvantage associated with simply enabling all ICDs to act as RNs is that the different PSS and SSS combinations from the 504 available combinations would need to be provided to the different ICD RNs, which may degrade system performance. For example, fewer PSS and SSS combinations would be left for the eNBs for use in cells that may be interfering, which may result in less separation between the common reference signals (CRSs) used in these potentially interfering cells.

Yet another potential disadvantage associated with simply enabling all ICDs to act as RNs is that RN functionality can increase power consumption in the ICDs, thereby reducing battery life.

Figure 6:
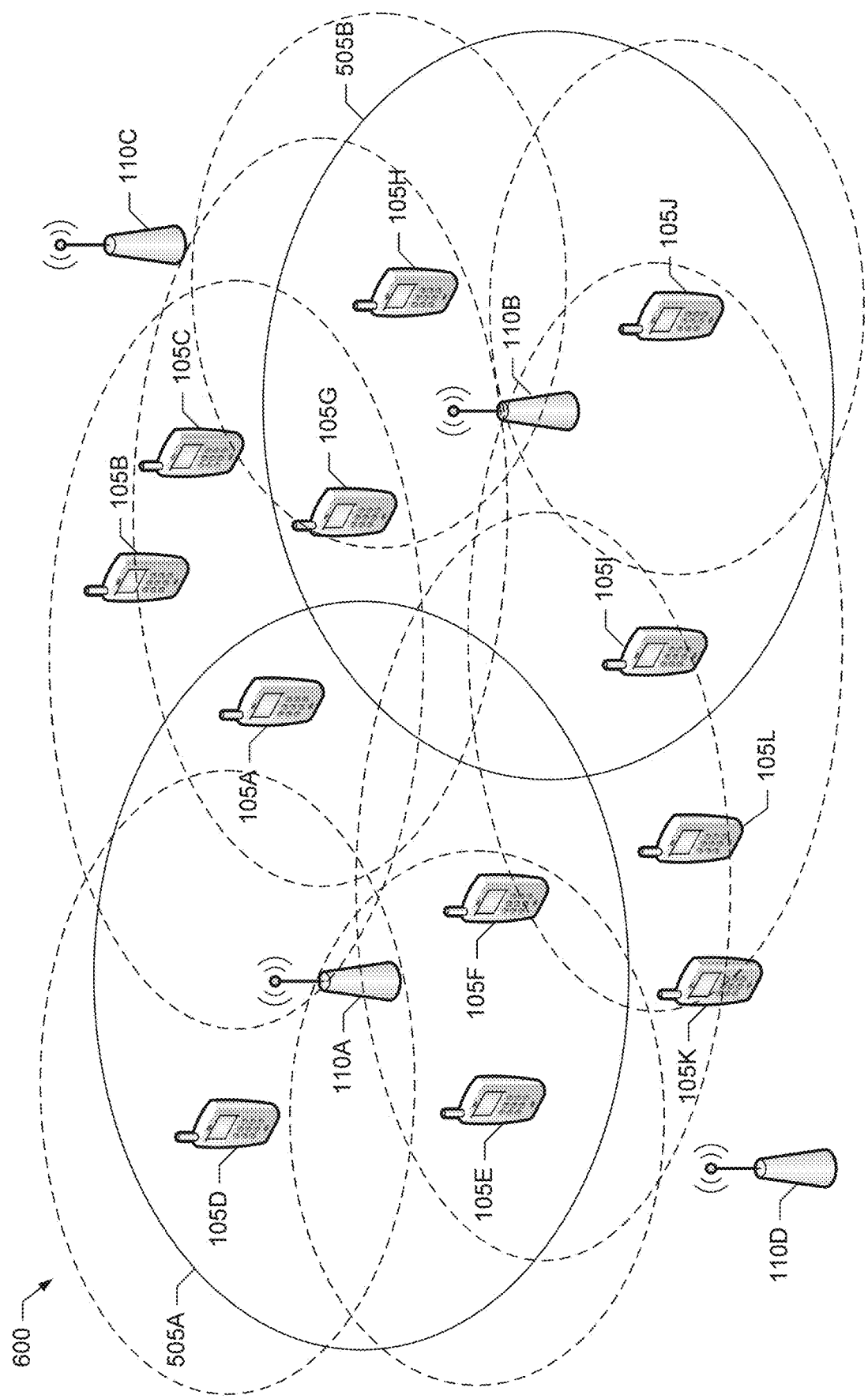
FIG. 6 is a block diagram illustrating a first example secondary coverage solution in which in-coverage UEs are speculatively or statically configured to enable relay node functionality.

An example scenario 600, which illustrates the potential disadvantages of simply enabling all ICDs to act as RNs in an example communication system, such as the system 100, is depicted in FIG. 6. In FIG. 6, the dotted ovals represent the secondary coverage areas of the respective ICDs 105A and 105D-J, which are acting as RNs. As illustrated in the example scenario 600, the secondary coverage areas of many of the ICDs 105A and 105 D-J are not in the vicinity of any of the NICDs 105B, C, K or L, or may substantially overlap the primary coverage area afforded by the eNBs 110A-B. As such, some of the ICDs 105A and 105 D-J may not provide secondary coverage for any of the NICDs 105B, C, K or L, and the overhead of providing relay resources for these ICDs 105A, D-J and coordinating their interference (represented by the overlap in the dotted ovals) will be wasted.

Example secondary coverage functionality disclosed herein, which may be implemented by the example secondary coverage processors 120, 120A-B and/or the relay node controller 125 described above, provide secondary coverage mechanisms that reduce the resources provisioned by the network for RN functionality and, thus, can alleviate at least some of the disadvantages of simply enabling all ICDs to act as RNs. In some examples, the secondary coverage processors 120, 120A-B and/or the relay node controller 125 implement a secondary coverage solution in which an ICD, such as the UE 105A, is to detect NICDs, such as one or more of the UEs 105B-C, before enabling more expensive RN functionality (e.g., in terms of increased system resource usage, increased power consumption, etc.) to enable connection with one or more NICDs.

To implement such a secondary coverage solution, in some examples, an ICD, such as the UE 105A, is configured by its secondary coverage processor, such as the processor 120A, to broadcast one or more secondary coverage signals (SCSs) to indicate to NICDs in the vicinity that the ICD is able to provide secondary coverage. In some such examples, the ICDs are able to indicate (e.g., implicitly) the resources via which an NICD can indicate its presence after the NICD as detected the SCS(s) broadcast by the ICD. Also, in some such examples, an NICD that detects the SCS(s) broadcast by an ICD sends (e.g., broadcasts) a presence indication (PI) in response to detecting the SCS(s). The NICD may send the PI, which informs a receiving ICD that an NICD is present and is requesting secondary coverage, via the indicated resources. Furthermore, in some such examples, the ICD(s) that detected the PI(s) from one or more NICDs are selectively enabled (e.g., by a donor eNB) to enable RN functionality or otherwise provide the NICD(s) with connection(s) to the network.

Figure 7:
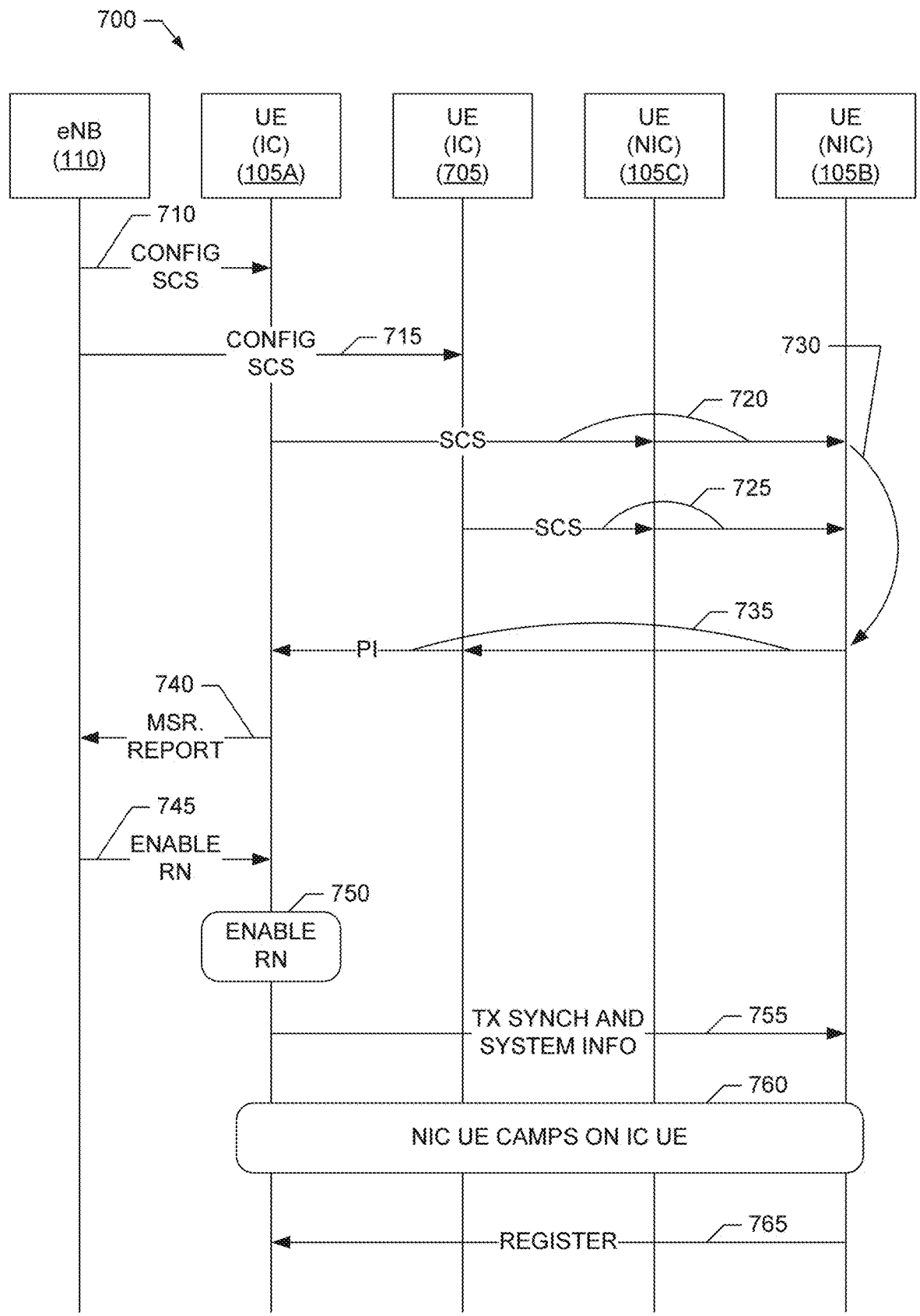
FIG. 7 is a message sequence diagram illustrating a second example secondary coverage solution in which in-coverage UEs are configured to enable relay node functionality based on detection of not-in-coverage UEs operating in the example system of FIG. 1.

An example message sequence diagram 700 illustrating such an example solution for providing secondary coverage in the example system 100 of FIG. 1 is illustrated in FIG. 7. The message sequence diagram 700 of the illustrated example depicts example messages that may be exchanged between the example eNB 110, the example ICDs 105A, 705 and the example NICDs 105B-C. The eNB 110, the ICD 105A and the NICDs 105B-C are depicted in the example system 100 of FIG. 1, whereas the ICD 705 is not depicted in FIG. 1, but is assumed to be in the primary coverage area of eNB 110.

Turning to FIG. 7, the message sequence diagram 700 begins with the eNB 110 sending example messages 710 and 715 to configure the respective ICDs 105A and 705 to begin broadcasting their respective SCSs. In response to receiving the configuration messages 710 and 715, the ICDs 105A and 705 begin broadcasting their respective SCSs 720 and 725, which may be received by zero or more NICDs, such as the NICDs 105B and/or 105C. In the illustrated example, the NICD 105B detects the SCS(s) broadcast by the ICD 105A. In response to detecting the SCS 720 (which is depicted by the directed line 730 in FIG. 7), the NICD 105B broadcasts a PI 735, which may be received by zero or more ICDs, such as the ICDs 105A and/or 705.

In the illustrated example of FIG. 7, the ICD 105A detects the PI 735 broadcast by the NICD 105B. In response to detecting the PI 735, the ICD 105A sends an example measurement report 740 to the eNB 105. As described in greater detail below, the measurement report 740 informs the eNB 105 that the ICD 105A has detected the PI 735 from the NICD 105B (although the ICD 105A may not know the identity of the NICD 105B or be able to distinguish between different NICDs sending different PI signals). In the illustrated example, in response to receiving the measurement report 740, the eNB 110 sends an example message 745 to configure the ICD 105A to enable RN functionality. At block 750, the ICD 105A enables its RN functionality, which causes the ICD 105A to broadcast (corresponding to the directed line 755) synchronization information (e.g., such as by broadcasting a PSS/SSS) and system information (e.g., such as by broadcasting MIBs and SIBs) for possible receipt by any NICD(s) in the vicinity of the ICD 105A. In the illustrated example of FIG. 7, the NICD 105B receives the synchronization and system information broadcast by the ICD 105A and uses this information to camp on the ICD 105A (corresponding to block 760) and register with the ICD 105A (corresponding to the directed line 765).

Accordingly, to implement the example secondary coverage solution represented by the example message sequence diagram 700 of FIG. 7, an example LTE-compliant UE can be modified as disclosed herein such that, when the UE is in a primary coverage area and connected to an access node (e.g., an eNB), the UE is configured to transmit SCS(s). For example, and as described in greater detail below, the UE may transmit its SCS(s) in the resources it would have transmitted SRS(s). Such a UE, when in a primary coverage area, can also be configured to search for PI(s) broadcast by NICD(s), where the PI(s) are to be broadcast using resources determined with respect to the SCS(s) broadcast by the UE, as described in greater detail. As such, the SCS(s) broadcast by a UE indicate an opportunity (e.g., in terms of resources, such as the timing) for an NICD to send a PI such that the UE broadcasting the SCS will be able to receive the PI. Such a UE can further be configured to report any detected PIs to its serving (or donor) eNB (or some other network node), which will instruct the UE when to start operating as an RN and when to stop operating as an RN.

Additionally, such an LTE-compliant UE can be modified such that, when the UE is not in any primary coverage area, the UE is configured to search for any SCS(s) in addition to performing any normal search procedures to detect the primary coverage offered by an eNB. When an SCS is detected, such a UE can be configured to determine (e.g., directly or indirectly from the received SCS) which resources (e.g., in terms of timing, etc.) are to be used to transmit a PI, and to transmit the PI via those resources in response to detecting the SCS. Such a UE can further be configured to continue to search for LTE coverage, include LTE RN secondary coverage that may be provided by an ICD in response to the UE transmitting its PI.

In the following discussion, it is assumed that ICDs and NICDs operating in a mobile communication system, such as the system 100 of FIG. 1, are able to be configured to receive UL signals. This is because in some of the example solutions for providing secondary coverage disclosed herein, UL signals are used to implement the SCS and PI signals disclosed herein.

Figure 8:
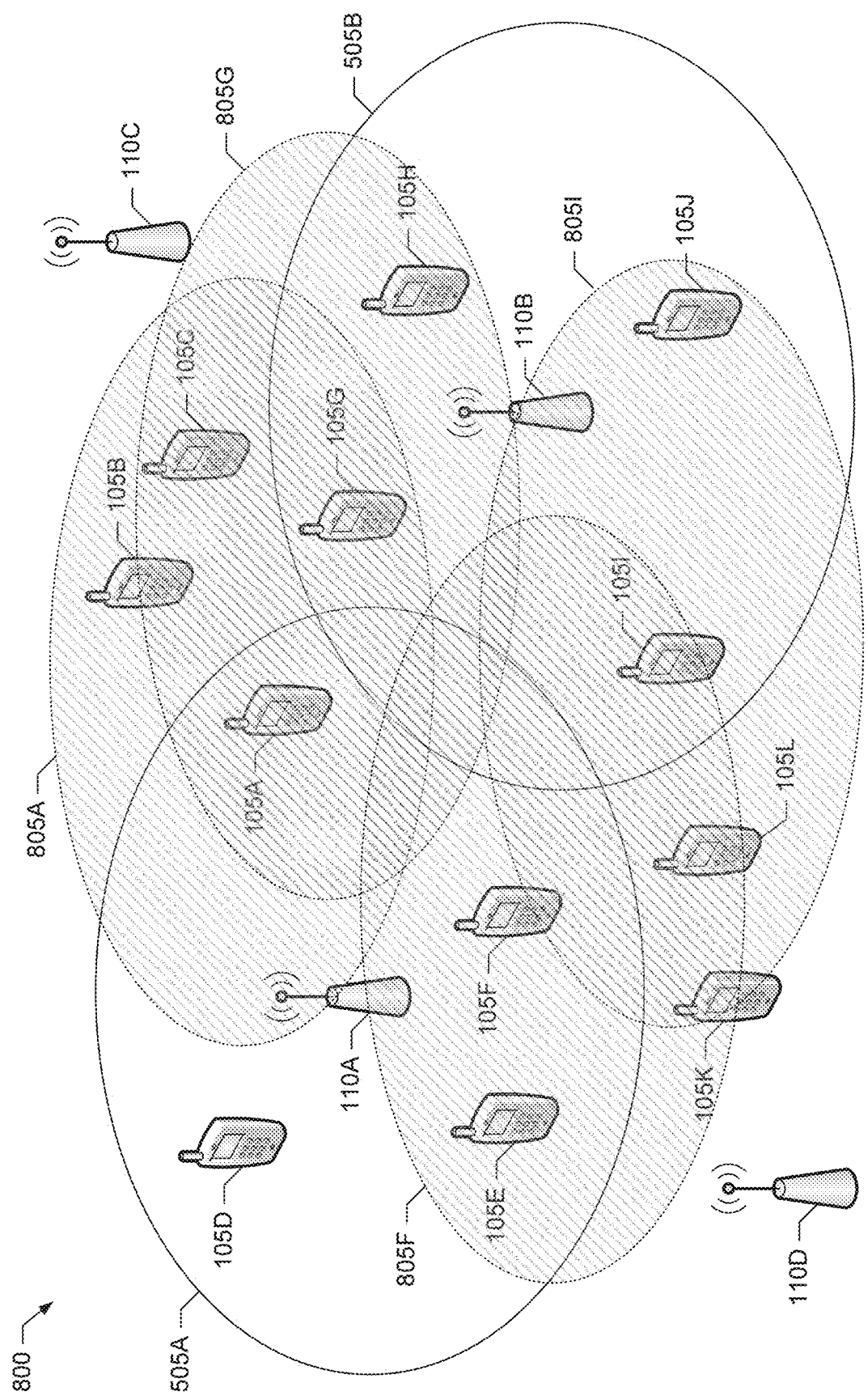
FIG. 8 is a block diagram illustrating transmission of secondary coverage signals by in-coverage UEs to implement the second example secondary coverage solution.

FIG. 8 illustrates an example scenario 800 in which the example ICDs 105A, 105F, 105G and 105I are transmitting respective example SCSs 805A, 805F, 805G and 805I in accordance with the example secondary coverage solution represented by the example message sequence diagram 700 of FIG. 7. In some example scenarios, such as a public safety scenario, one or more ICDs may provide a secondary network connection to an NICD. To indicate that a secondary connection is possible, SCS(s) are transmitted from such ICDs. In some examples, ICDs may be configured to avoid operating in a relay mode, such as, for example, operating as a relay node as defined in Section 4.7 of 3GPP Technical Specification (TS) 36.300, V11.3.0 (September 2012), unless the presence of at least one NICD is detected. 3GPP TS 36.300, V11.3.0 is hereby incorporated by reference in its entirety. Accordingly, such ICDs do not expend relay node resources and power to send, for example, PSS, SSS, MIBs and/or SIBs unless the presence of at least one NICD is detected.

In some examples, the SCS is derived from an existing UE to eNB signal that utilizes few resources and does not require significant additional functionality to be added to LTE UEs. For example, an SCS transmission can occur in resources that are known (by means of prior configuration or specification in a future LTE standard) to NICDs that may not have been in network coverage before. Such an SCS transmission, received by the NICDs in its range, indicates that the receiving NICDs may be able to connect to the network via the ICD transmitting the received SCS.

Unlike existing mechanisms for indicating cell coverage, the example secondary coverage procedure disclosed herein indicate to NICDs the possibility of obtaining secondary coverage, without actually providing secondary coverage initially. Such an approach may result in more efficient use of system resources because ICDs acting as relay nodes may utilize more system resources than ICDs transmitting SCSs.

In some examples, an SCS indicates (1) the presence of at least one ICD that may provide a secondary connection to the network, and (2) the resources that an NICD receiving the SCS may use to indicate the presence of the NICD. To be detectable above noise and without knowledge of timing, the SCS may use a sequence, such as a complex symbol sequence, that can be robustly detected. Similar sequences are used currently in LTE, such as, for example, in the generation of the PSS.

Returning to FIG. 8, the example scenario 800 depicts transmission of the SCSs 805A, 805F, 805G and 805I by a respective subset of the ICDs 105A, 105F, 105G and 105I. In the illustrated example of FIG. 8, the coverage areas of the SCSs 805A, 805F, 805G and 805I are shown as dashed ellipses. In some examples, the SCSs 805A, 805F, 805G and 805I are much lower in overhead than the primary coverage signals implementing the primary network coverage areas 505A and 505B. In some examples, the SCSs 805A, 805F, 805G and 805I transmitted by the respective ICDs 105A, 105F, 105G and 105I do not identify or otherwise distinguish which ICD is transmitting which SCS. Instead, the SCS conveys to a receiving NICD that an ICD is available in the vicinity, but does not enable the NICD to determine which ICD sent the received SCS. For example, the SCS may provide a 1-bit availability indication without any further information, which can help reduce the cost associated with the resources used by the ICD for transmitting SCS, as well as the cost of decoding the received SCS by the NICD. As such, in some examples, different ICDs may transmit similar SCSs.

The following are example procedures associated with transmitting an SCS. In some example scenarios, such as in the example scenario 800 of FIG. 8, some ICDs, which are connected to one or more cells, may be configured to search for (or look for) the presence of NICDs. Such ICDs (e.g., the ICDs 105A, 105F, 105G and 105I of FIG. 8) are said to be configured in a lookout mode, to distinguish them from other ICDs (e.g., the ICDs 105D, 105E, 105H and 105J of FIG. 8) that are not configured to provide secondary coverage, as well as legacy LTE UEs, devices that are acting as legacy LTE relays, etc.

In some examples, the network may apply one or more criteria to select the ICDs to be configured to be in the lookout mode. For example, remaining battery power may be used to avoid selecting ICDs that may not be able to sustain a secondary coverage connection. Additionally or alternatively, power headroom may be reported by UEs and used by an eNB to select those UEs that are near the cell edge to be in lookout mode. Additionally or alternatively, UE measurement reports may indicate to an eNB that one or more UEs are near other cells despite being near the current cell's edge and, thus, may not be good candidates for the lookout mode (e.g., because it may be unlikely that these UEs will be called upon to provide secondary coverage as the other cells near these UEs may be able to provide primary coverage). Additionally or alternatively, a UE's geographic location may be used by the network in a similar manner to determine whether to select the UE for configuring into lookout mode.

An ICD, such as the ICD 105A, transmits various signals as part of the connected mode procedures with its serving eNB, such as the eNB 110. Such signals may also be receivable by one or more NICDs, such as the NICDs 105B-C, outside the coverage area of the eNB. In some examples, such signals, which are used for UE-to-eNB communication, may also act as an SCS being transmitted by the ICD. In some such examples, one or more additional signals may be transmitted by the ICD to indicate when the PI is to be transmitted by an NICD.

For example, an ICD may also transmit a further transmission (e.g., separate from the SCS, which is referred to hereinbelow as an SCS resource signal or SCS-R) that has a property that allows a receiving NICD to determine the resources in which the NICD can indicate its own presence (e.g., by transmitting a PI signal). In some examples, this further transmission (e.g., SCS-R) may be configured by the network to be sent at a particular time with reference to the downlink subframe timing at the ICD.

As discussed above, an NICD can detect an SCS (and/or other ICD transmissions) to note the availability of secondary coverage via one or more ICDs in the vicinity. In some examples, multiple ICDs (e.g., the ICDs 105G and 105I) may be pre-configured (e.g., based on future standardization) or configured by the eNB (e.g., the eNB 110B) to transmit the same signal as their respective SCSs. In other words, multiple ICDs may use the same SCS parameters to generate and transmit their respective SCSs. Such an arrangement can simplify the detection of the SCS at the NICDs, because the receiving NICD does not need to discriminate between the ICDs in this stage of the secondary coverage procedure.

The following are example procedures for detecting an SCS at an NICD. In some examples, NICDs are configured (e.g., by the network), pre-programmed (e.g., during manufacture), or otherwise provided with the knowledge of the structure of the SCS and its bandwidth with respect to the resources (e.g., frequency bands, symbol times, etc.) in which the SCS should be sought. This is analogous to cell synchronization in existing LTE systems in which the UEs know to look for the cell synchronization in the center 6 RBs of specified bands.

In some examples, cell search procedures for NICDs are extended to include an attempt to detect an SCS if an NICD fails to detect a cell providing primary network coverage. For example, failure to camp at any stage of the cell synchronization process may be considered a cause for an NICD to attempt to discover an SCS being transmitted by a nearby ICD. Furthermore, in some examples, an NICD may be required to successfully detect an SCS from an ICD configured to offer secondary coverage before the NICD initiates any request for service via a secondary coverage solution.

As described above and in greater detail below, at the end of the SCS detection procedure, an NICD is able to determine the presence or absence of available secondary coverage by determining whether an SCS signal was detected. For example, the detection of any SCS may indicate to an NICD that secondary coverage is available, whereas not detecting any SCS may indicate to the NICD that secondary coverage is not available. Furthermore, if an SCS is detected as present by an NICD, the NICD may then proceed to request secondary coverage connection by sending a PI as described above and in greater detail below.

The following are example procedures for generating and transmitting SCSs and, thus, for an ICD to indicate the availability of second coverage. As noted above, in LTE systems, such as the example system 100, a UE may transmit an SRS, which can be used by a receiving eNB to estimate UL channel quality. An SRS is similar to a PSS transmitted by an eNB in that both signals are generated based on Zadoff-Chu (ZC) sequences. Accordingly, in some examples, SRS signal generation techniques form the basis for generating an SCS, because SRS-like signals can be used to perform symbol timing acquisition and carrier frequency synchronization at unsynchronized UEs (e.g., NICDs) as is currently done with LTE synchronization signals. (See, for example, Section 4.1 in 3GPP TS 36.213, V11.3.0 (June 2013), which is incorporated herein by reference in its entirety.) For example, ICDs (e.g., such as the ICDs 105A, 105F, 105G and 105I) can be configured with a sub-band SRS, with the sub-band of the center 6 RBs transmitting a particular sequence that is interpreted by receiving NICDs to be an SCS. While such a signal may look like an SRS to a receiving eNB, to an NICD this signal represented an SCS and indicates the availability of secondary coverage. In some examples, NICDs attempt to detect such an SCS in the center 6 RBs in a manner similar to how PSS detection is performed in a cell detection procedure, but in different resources (e.g., in terms of frequency, symbol time, etc.). Furthermore, in some such example cell detection procedures, if a PSS is detected, then the UE attempts to obtain coverage through the cell transmitting the PSS before attempting to obtain secondary coverage via attempting to detect an SCS.

Although existing SRS transmissions might be detectable by NICDs and, thus, could be used as an SCS, such existing SRS transmissions can occur using a variety of base sequences, transmission bandwidths, symbol locations, etc. To simplify the processing at the NICDs, in some examples, a reduced number of possible SRS transmission parameter combinations are specified (e.g., via eNB configuration, future standardization, etc.) for use in generating SCSs. This smaller set of SRS transmission parameters may be reserved (not used by eNBs that do not provide secondary coverage) and may be obtained as follows.

In some example, the SCS consists of an SRS transmission within the middle 6 RBs in terms of frequency and occupying a single symbol in the time domain. For example, the default symbol for this transmission can be the last symbol of a sub frame that corresponds to the current time-domain resources being used by the ICD for SRS transmissions.

In some examples, the SCS is transmitted by an ICD using uplink resources regardless of whether the system is time division duplex (TDD) or frequency division duplex (FDD). Also, in some examples, the network may use a separate ZC sequence for the SCS than is used for the other transmissions, such as the downlink PSS transmissions. In this way, the resources used for PSS and SCS are separate and, as such, NICDs are unlikely to mistake an SCS for a PSS that is transmitted by the eNB.

In some examples, similar to the existing PSS, a length-62 Zadoff-Chu sequence is used to generate the SCS. This allows a length 64 fast Fourier transform (FFT) to be used for SCS detection processing, and reduces or eliminates the possibility of confusing the signal with the uplink demodulation reference signals (e.g., because the uplink reference signals are based on Zadoff-Chu sequences having other lengths). Since such SCS signals are similar in length and structure to the existing PSS signals, existing PSS detectors can be modified to support SCS detection, where such modification includes accounting for the removal of the direct current (DC) subcarrier since the SCS is transmitted on the uplink, whereas the PSS is transmitted on the downlink. For example, the SCS can be transmitted by an ICD using the 31 subcarriers on each side of the DC location. Accordingly, in such examples, the SCS thus uses both subcarrier combs of the normal SRS resources, instead of splitting alternate subcarriers (e.g., combs) among different UEs as defined in Section 8.2 of 3GPP TS 36.213, V11.3.0.

In some examples, the sequences (e.g., complex symbol sequences) used for the SCS are chosen to reduce or have minimum correlation with the PSS, which thereby can reduce the possibility of an NICD confusing the SCS with the existing PSS in a TDD system. For example, a subset of the length 64 ZC sequences may be reserved (by means of standardization) for SCS, and not used for PSS when secondary coverage is desired.

In some examples, the SRS configuration that is employed as an SCS within a cell may be configurable separately from the other SRS configuration performed by the eNB serving the cell. Such an arrangement can allow the serving eNB to vary the parameters of the SCS, such as its periodicity, independently of the SRS configuration of the ICDs in the cell.

In some examples, an eNB may separate (in code space and/or time) the SCS transmissions of the ICDs in the cell served by the eNB. For example, the eNB may configure different Zadoff-Chu sequences to be used as the SCS for different ICDs, and/or the eNB may configure different time resources for use by different ICDs to transmit the same or different SCS sequences. In such examples, the SCS transmissions are uniquely identifiable to a particular ICD at the eNB and, thus, can still be used by the eNB for sounding (similar to how an SRS is used), in addition to being used as SCSs. However, in such examples, the detection of the SCS at the NICDs may incur more complexity than if the SCS transmissions from different ICDs were the same.

In some examples, instead of providing separate resources for SCS transmission to different ICDs, the ICDs within one or more cells use the same sequence and resources to generate and transmit their respective SCSs and, thus, the distinction between the ICDs is performed at a later phase of the secondary connection procedure (e.g., when a connection request is received from an NICD). In such examples, although the SCS detection at the NICD is made easier, because fewer SCS configurations are possible, the eNB is unable reuse the transmitted SCS signal for sounding (e.g., because a transmitted SCS is not identifiable with a particular ICD). However, other transmissions of SRS in the SRS resources continue to be usable for sounding. Also, in some examples, the SCSs of different cells are configured differently to allow a connecting NICD the option to pick the best cell (e.g. eNB) from which to obtain secondary coverage.

In some examples, the ZC sequence conveyed by SCS has a different length than existing SRSs, and/or uses a different number of RBs (6 vs. 4 or 8 or more), and/or uses both subcarrier combs instead of alternate subcarrier combs so that the NICDs can have a low probability of confusing an unmodified SRS as an SCS.

The following are example procedures related to SCS power control. In some examples, an eNB configures or instructs the ICDs within its cell to use a fixed-power for the SCS transmissions. In some examples, the eNB configures a different fixed power setting for SCS transmissions in its cell, which is independent from those used by neighboring eNBs. In some examples, the eNB configures different fixed SCS power settings for different ICDs within the cell served by the eNB, and these fixed SCS power settings may be the same as or independent (e.g., different) from those used by neighboring eNBs. In some examples, the eNB instructs the ICDs to use an open or closed loop power control process in which, for example, transmit power is set relative to the measured downlink estimated pathloss. The motivation behind using a transmit power level relative to the measured downlink estimated pathloss is that the ICDs that are most likely to provide secondary coverage to NICDs are those ICDs that are near the edge of coverage, which implies that such ICDs will have the greatest downlink pathloss values. Meanwhile, those ICDs close to the eNB would be less likely to provide secondary coverage and, thus, reducing their SCS transmission power can reduce interference both in-cell and out-of-cell. In some examples, instead of using just the estimated downlink pathloss, the SCS power control can additionally or alternatively utilize the timing advance provided by the eNB to the ICD to account for the effect on pathloss of obstructions that may exist between the eNB and the ICD.

Figure 9:
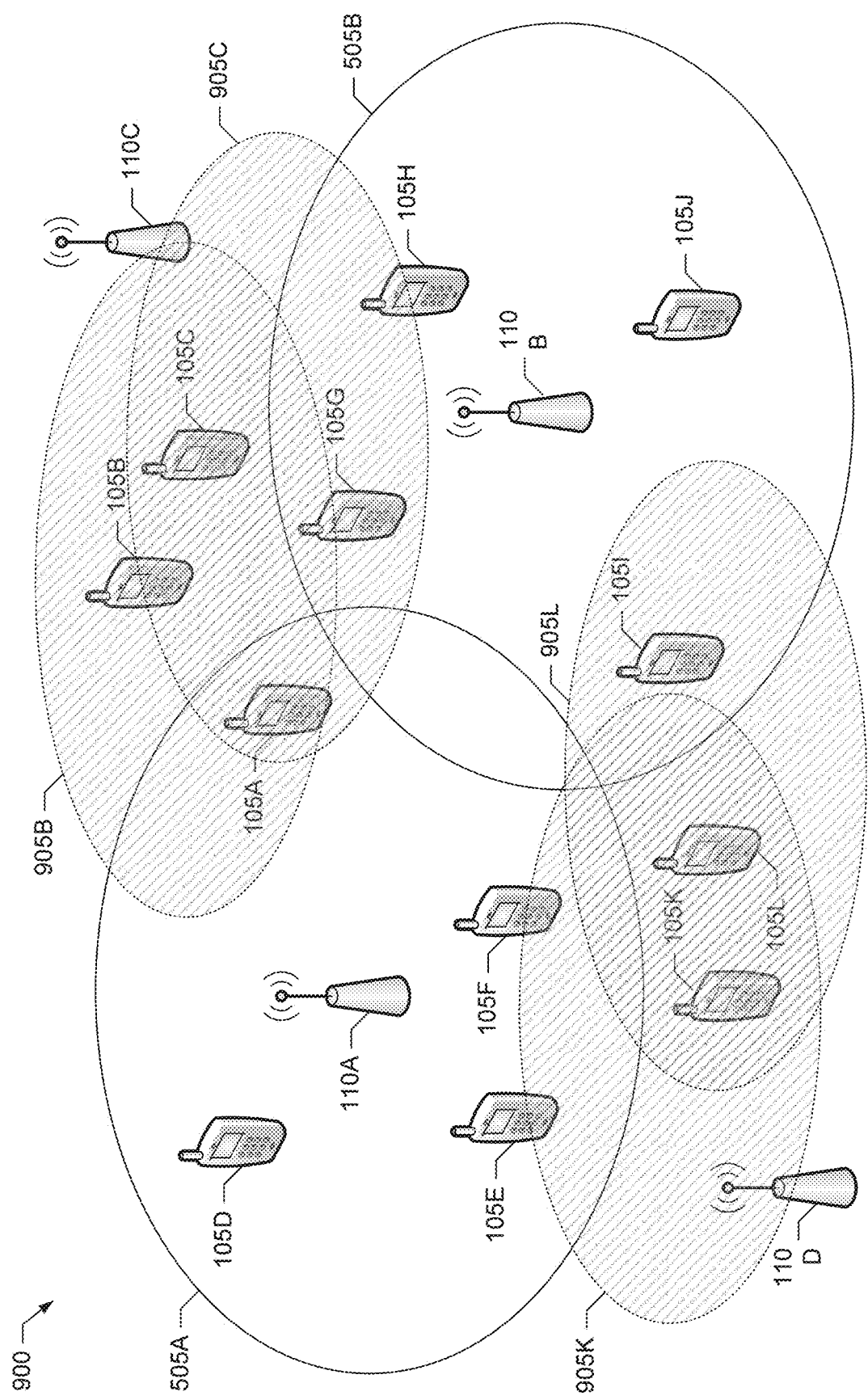
FIG. 9 is a block diagram illustrating transmission of presence indicators by not-in-coverage UEs to implement the second example secondary coverage solution.

FIG. 9 illustrates an example scenario 900 in which the example NICDs 105B, 105C, 105K and 105L are transmitting respective example PIs 905B, 905C, 905K and 905L in accordance with the example secondary coverage solution represented by the example message sequence diagram 700 of FIG. 7. As described above, in response to detecting an SCS, an NICD that desires a secondary connection indicates its presence by transmitting a PI. This PI is signalled on the resources indicated by the received SCS and via which the transmitting ICD will attempt to receive the PI. For example, a PI may be sent by an NICD after detection of an SCS, where the SCS acts as a marker to the resources where the PI may be sent, and may also indicate different possible choices of coverage when different SCS sequences are used.

In some examples, the PI transmitted by an NICD is not directed towards a particular ICD. For example, in scenarios where multiple ICDs are transmitting identical SCSs, it may not be possible for an NICD to identify/distinguish which ICD transmitted a given received SCS. In some examples, the PI also may not be indicative of the number or identity of the NICDs receiving the transmitted SCS(s). For example, a PI signal from a particular NICD may be received by multiple ICDs in range, and/or PI signals from multiple NICDs receiving SCSs from different ICDs may be received at a given ICD even if that ICD's SCS was not received at some or all of the NICDs associated with the received PIs. In such examples, system resources may be conserved by avoiding the cost of identifying specific devices until during the connection setup portion of the example secondary coverage procedures disclosed herein.

In examples in which the network employs the same SCS sequence and PI signal for some or all ICDs and NICDs, respectively, the same PI may be received by several ICDs, one or more of which may then start functioning as relay nodes. Using the PIs received from the NICDs by the ICDs and reported by the ICDs to the network, the network may be able to determine which ICD(s) may be able to serve several NICDs, thereby conserving system resources that would otherwise be required to operate multiple ICDs as relay nodes.

Returning to FIG. 9, the example scenario 900 depicts transmission of the PIs 905B, 905C, 905K and 905L by the NICDs 105B, 105C, 105K and 105L in response to receiving a previous set of SCS transmissions (e.g., such as the SCSs 805A, 805F, 805G and 805I illustrated in the example scenario 800 of FIG. 8). In the illustrated example of FIG. 9, the PIs 905B, 905C, 905K and 905L are shown as dashed ellipses representing the regions in which the respective PIs are receivable. In some examples, only some of the ICDs that transmitted SCSs (e.g., such as the example ICDs 105A, 105F and 105I in FIG. 9) receive PIs and transition into operating as relay nodes. The other ICDs (e.g., the example ICD 105G in FIG. 9) may remain as ICDs that continue to operate in lookout mode and, thus, continue to transmit their respective SCSs. However, the ICDs (e.g., the ICD 105A, 105F and 105I) that receive PIs report the receipt of the PIs to the network and, thus, are known by the network as having the potential to provide secondary coverage to one or more NICDs (e.g., the NICDs 105B, 105C, 105K and 105L of FIG. 9) that would benefit from secondary coverage. The SCS transmissions and the following PI transmissions may occur in consecutive iterations. In some examples, the NICDs that remain out of service wait to receive SCS transmissions, and then wait for the indicated opportunity to transmit PI. At that time, the NICDs that have successfully decoded an SCS of a previous iteration may transmit their respective PIs to indicate their presence to any ICDs in the vicinity.

The following are examples of resources and signals that may be configured and used to transmit PIs. As described above, NICDs monitor for SCS transmissions from ICDs to determine an opportunity for sending a PI signal, such as by determining (e.g., from the received SCS) the resources via which a PI signal may be sent. The ICDs, in turn, monitor these resources for possible PI transmissions from NICDs. In some examples, an eNB, such as the eNB 110A, may provide configuration information to the ICDs (e.g., the ICD 105A) served by the eNB indicating the sub-frames and/or resources (e.g., RBs, symbols, subcarriers, etc.) on which presence indications can be transmitted. In some examples, an ICD transmits its SCS such that a receiving NICD determines, based on when the SCS was received, when the NICD is to have an opportunity to transmit its PI. For example, NICDs may be configured to transmit their PI signals a particular number (e.g., 10 or some other number) of sub-frames after receipt of an SCS.

In other examples, information concerning the time at which an ICD is looking to receive presence indications from NICDs is conveyed by the ICD in a subsequent SCS-R transmission, which may be a variation of the SCS. In such examples, the SCS-R is detectable at the NICDs and implicitly indicates a time allocated for PI transmission. In such examples, NICD that receive an SCS are able to detect the possibility of obtaining secondary coverage, but wait for reception of a subsequent SCS-R transmission to determine when to transmit its PI. These NICDs may also be configured to derive the resources to transmit the PI from the received SCS-R. For example, the resources for transmitting PI signals may be configured to be a particular number (e.g., 10 or some other number) of sub frames after the SCS-R is received by an NICD in the center 6 RBs. The benefit of such a mechanism is that, while the periodic SCSs may be used to indicate coverage, the SCS-R can indicate specific occasions where resources are reserved for PI. This allows the SCS to be provisioned independently from the PI occasions, which may require more resources because, for example, the PI transmission may not be aligned to uplink timing and, thus, may benefit from having guard time reserved for receipt of PI transmissions.

In some examples, particular ZC sequences may be reserved (e.g. by future standardization) for SCS and SCS-R. For example, if a length 64 ZC sequence is used for the SCS, then one out of the three roots may be used for the SCS, whereas another root may be used for SCS-R. In this manner, the SCS-R used to signal the opportunity to send the PI is distinctly detectable at the NICDs relative to the SCS used to signal the availability of secondary coverage.

In some examples, an eNB may configure ICDs served by the eNB with the periodicity and/or timing of the resources via which a PI may be transmitted, in addition to providing the timing of the SCS. The timing of the PI resources may be specified by the eNB in terms of UL sub-frames. For example, the timing of the PI resources may be indicated by the eNB to coincide with the eNB's own PRACH allocations if PRACH is used to transmit PI signals, as described in further detail below.

As described above, the PI signal indicates, to a receiving ICD, the presence of at least one NICD. However, in some examples, the PI provides no further identification or discrimination of the particular NICD that transmitted the PI.

Also, in some examples, the NICD derives PI timing from an SCS or other ICD-to-NICD transmission received from an ICD. This is because an NICD is not in a primary coverage area yet and, thus, has not received a time alignment command yet from the network. Accordingly, an NICD may establish PI timing and transmit a PRI signal in a manner analogous to how a UE establishes timing when transmitting on PRACH.

Moreover, in some examples, the NICD is configured to use a particular PRACH preamble to signal its PI on sub-frames specified as having resources reserved for PI transmission. In such examples, a particular PRACH preamble, referred to herein as the PI preamble (PIP), or set of PIPs, is reserved for the purpose of conveying PIs in a cell and, thus, is not used by UEs for other PRACH transmissions in the coverage area of the that cell. For example, NICDs may be configured (e.g., when the NICD was previously in-coverage) or pre-programmed (e.g. based on a standard specification) with the PIP(s) to be used to convey their respective PIs, and the same or different PIPs may be used for different NICDs.

In some examples in which PIPs are used to convey PIs, the ICDs configured by the eNB to transmit SCSs in the cell attempt to decode the UL PRACH in the particular subframes where the ICDs are configured to search for PIPs. This is because, in such examples, an NICD that is able to decode an SCS and desires secondary coverage will transmit its PIP in a PRACH at an opportunity based on the timing and frequency derived from the received SCS (or derived from an SCS-R associated with the received SCS), as described above.

In some examples, the network can amortize the overhead of reserving a PRACH allocation for the sending the PI signal by using existing PRACH allocations, where the PRACH configuration is such that at least the PIP is not configured to be used by ICDs. In such examples, the ICDs that are configured to attempt to detect a PIP are not able to receive DL data in that sub frame in an FDD system.

In some examples, because of the possibility that the NICDs have not yet been in any primary coverage area and, thus, have not had an opportunity to obtain any network configuration prior to detecting an SCS, default values for the RACH parameters used to send PIPs, such as the root sequence and power ramping steps, may be pre-programmed (e.g. based on a future standard specification) in the NICDs.

In some examples, an eNB also configures, or indicates dynamically, the resources to be used by ICDs to report detection of PIs from NICDs. Such a report may be in the form of a message indicating detection of PI. For example, in the case of the PI signals being implemented by PRACH transmissions, the report of a received PIP may be conveyed by the ICD to the eNB using the example radio resource control (RRC) message of Table 1.

TABLE 1

```
PIResult ::= SEQUENCE {
    pip-Recv        SEQUENCE {
        pip             PI-RACH-Preamble      OPTIONAL,
    }
}
```

An example of the PI-RACH-Preamble information element (IE) of Table 1 is illustrated in Table 2.

TABLE 2

```
-- ASN1START
PI-RACH-Preamble ::=    SEQUENCE {
    ra-PreambleIndex        INTEGER (0..63),
    ra-PRACH-MaskIndex      INTEGER (0..15)
}
-- ASN1STOP
```
ra-PRACH-MaskIndex
Explicitly signaled PRACH Mask Index for Random Access (RA) Resource selection as specified in, for example, 3GPP TS 36.321, V11.3.0 (July 2013), which is hereby incorporated by reference in its entirety.

TABLE 2-continued ra-PreambleIndex
Explicitly signaled Random Access Preamble for RA Resource selection as specified in, for example, 3GPP TS 36.321, V11.3.0.

In some examples, an ICD may additionally or alternatively notify the eNB of a received PIP by means of additional signaling (e.g., such as that associated with Tables 1 and 2) included within a measurement report sent to the eNB.

Figure 10:
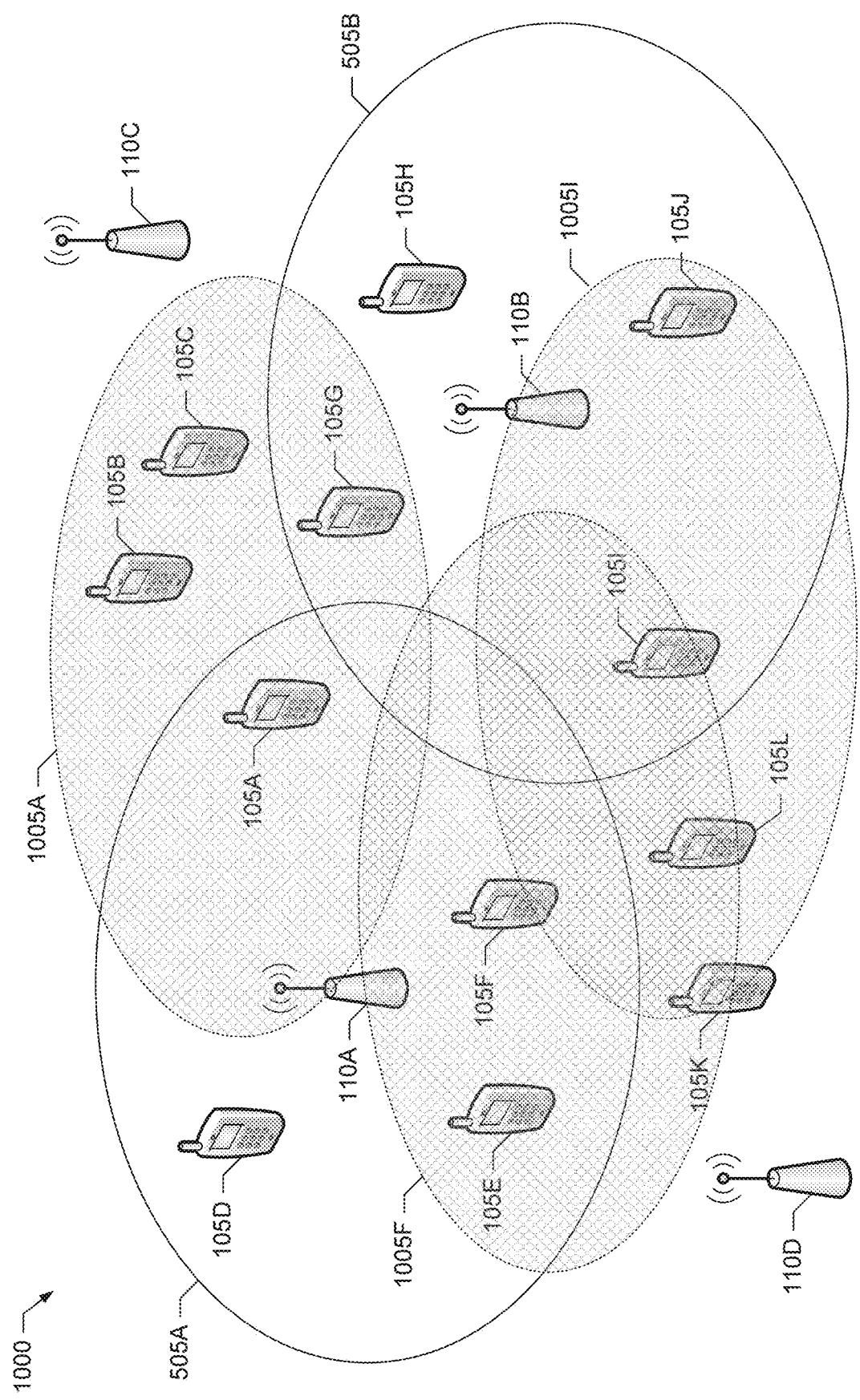
FIG. 10 is a block diagram illustrating configuration of relay node functionality by selected in-coverage UEs to implement the second example secondary coverage solution.

FIG. 10 illustrates an example scenario 1000 in which the example ICDs 105A, 105F and 105I are configured to enable RN functionality in accordance with the example secondary coverage solution represented by the example message sequence diagram 700 of FIG. 7. In the illustrated example of FIG. 10, by using the reports of PIs that were detected by ICDs configured to send SCSs, the network is able to discriminate those one or more ICDs that have a high likelihood of being able to provide secondary coverage to one or more NICDs. In such examples, the appropriate ICDs can be identified, selected and configured to provide secondary coverage as follows.

For example, after a PI from an NICD is received by one or more ICDs operating in lookout mode, the ICDs indicate the PI reception, possibly along with measured characteristics of the received PI signal, to their serving eNB. The eNB then selects (e.g., based on one or more criteria, such as number of PIs reported as being received in a particular time interval, strength of the PI(s) reported as received, number of nearby ICDs also reporting PI(s), and/or as otherwise described herein) and signals to one or more of the ICDs to exit the lookout mode and to start functioning as LTE relay nodes. In accordance with the LTE specifications, these ICDs are assigned cell identifiers by the eNB, along with the parameters for the MIB and SIB information to be transmitted by the ICDs when functioning as relay nodes. In some examples, the relay nodes operate on one or more carrier frequencies to connect with the NICDs that are different from the carrier frequency or frequencies used by the eNB to provide primary coverage in the cell. The ICD(s) configured to be relay nodes then transmit their respective cell synchronization signals (e.g., PSS/SSS) and MIB and SIBs based on the configuration received from the eNB, in the same manner as existing LTE relays. However, the example secondary coverage techniques disclosed herein are not limited to relays operating in accordance with existing LTE relay specification. Instead, it is sufficient that the selected ICDs function as relay nodes in a generic sense in accordance with any communication technique capable of supporting secondary coverage through relays or similar mechanisms.

Returning to the FIG. 10, the example scenario 1000 depicts an example operation in which, based on one or more of the selection criteria disclosed above, the network selects ICDs 105A, 105F and 105I to be configured as relay nodes providing secondary coverage. The relay node functionality of the selected ICDs 105A, 105F and 105I is then enabled such that these ICDs are able to implement respective example relay node coverage areas 1005A, 1005F and 1005I in the illustrated example. Different cell identification information may be configured for two or more of the ICDs 105A, 105F and 105I acting as relay nodes. The cell identifiers may then be used by the NICD(s) in the vicinity of the ICDs 105A, 105F and 105I to determine the best ICD from which to obtain secondary coverage. For example, the NICD 105K may detect the cell synchronization signals and MIB/SIBs broadcast by both the ICDs 105F and 105I operating as relay nodes, and use the respective cell identifiers for these ICDs to determine to which of the ICDs 105F and 105I the NICD 105K is to request secondary coverage.

In some examples, after transmitting their respective PIs, the NICDs resume or continue to perform their respective cell search procedures to find new cells that have been started due to one or more ICDs being configured to start acting as relay nodes. In such examples, the NICDs can connect to the network via such newly-established relay node(s), possibly in a manner similar to how the NICDs would connect to existing LTE cells. In some examples, the eNB further indicates to the in-coverage UEs in range of the newly enabled relay nodes that their associated relay cells are to be avoided, which can help reduce the power consumption of the ICDs that are now functioning as relays.

In some examples, those ICDs that were not selected to become relay nodes remain in lookout mode and, thus, may continue the process of transmitting their respective SCS signals and attempting to detect received PI signals. Also, one or more ICDs that had switched over to relay mode, but either did not receive a RACH from any NICDs or that are no longer serving any NICDs, may be switched back by the network (e.g. via eNB signalling) to the lookout mode as ICDs or to connected mode as in-coverage UEs.

Figure 11:
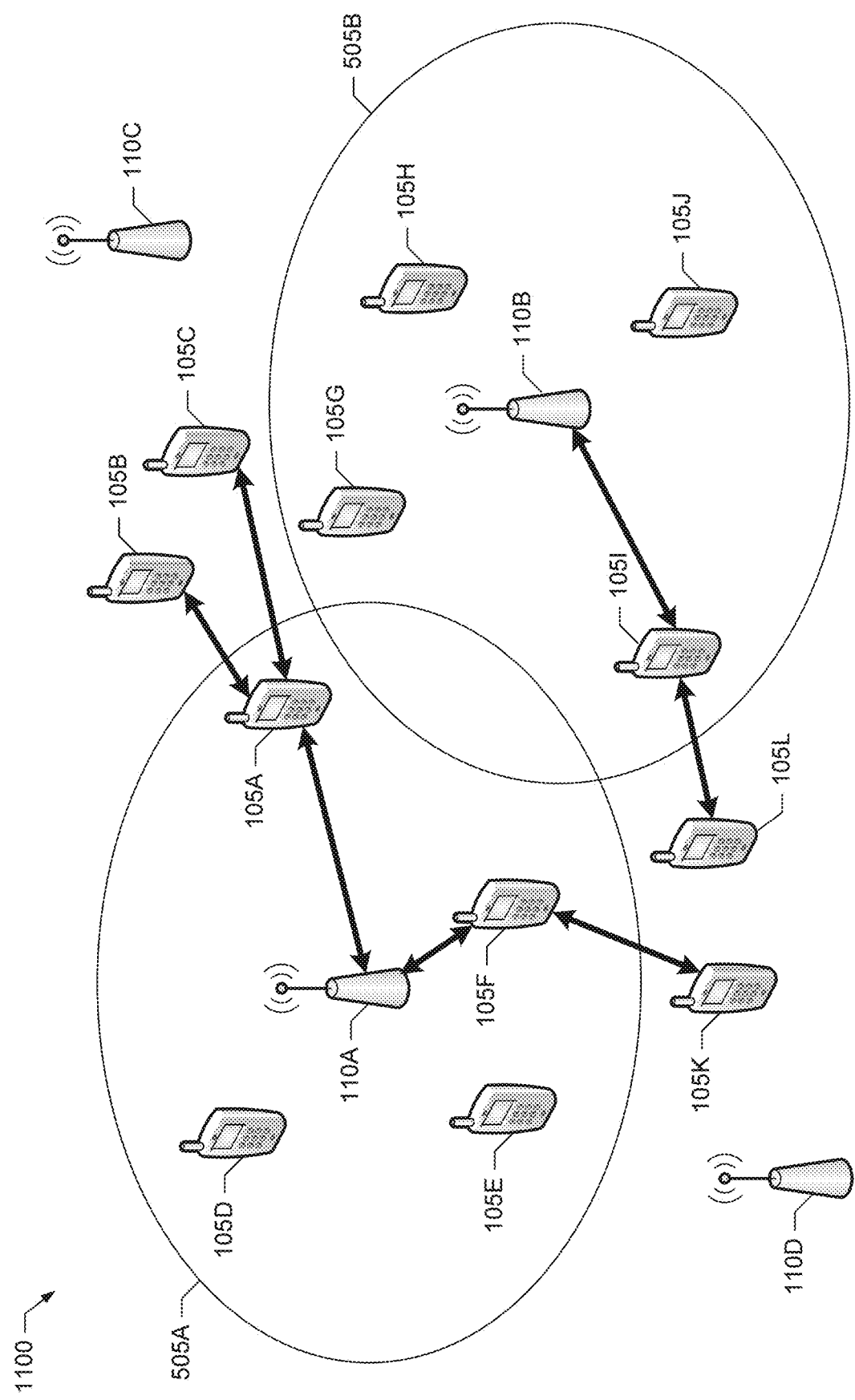
FIG. 11 is a block diagram illustrating not-in-coverage UEs obtaining network access from the selected in-coverage UEs in accordance with the second example secondary coverage solution.

FIG. 11 illustrates an example scenario 1100 in which the example ICDs 105A, 105F and 105I are configured to enable RN functionality in accordance with the example secondary coverage solution represented by the example message sequence diagram 700 of FIG. 7. The example scenario 1100 also illustrates corresponding example connections, represented by bi-directional arrows, that are used to provide the NICDs 105B, 105C, 105K and 105L with secondary coverage to the network. Also, although not shown, in some examples one or more of the ICDs that were configured to enable relay node functionality may revert from relay node mode back to lookout mode because those ICD(s) ultimately were not needed to connect to any NICDs (e.g., after a timeout period). For example, the network can monitor the ICDs that have been configured to act as relay nodes after reporting a PI, but which did not establish a connection to any NICD. In such examples, the network, or the ICDs themselves, can use a timer to determine when to revert back to being an ICD in the lookout mode (e.g., if no connection request is received from an NICD within a particular timeout period). Further, the measurement reports from the NICDs that have connected to the ICDs acting as relay nodes can be used by the network to determine if any other cells (e.g., primary cells implemented by eNBs and/or secondary cells implemented by relay nodes) are measurable by the NICD. This information can be conveyed to the donor eNB that is to provide secondary coverage, and the donor eNB can then determine which coverage of the ICDs in relay node mode is non-overlapping and, thus, is able to reuse the resources between the relay nodes, where possible.

In some examples, a reserved PRACH preamble, called the secondary coverage PRACH preamble (SCPP), which is also a ZC sequence like the PSS, may be used instead of an SRS-like signal to implement the SCS disclosed above. Such an SCPP can be indicated as reserved for SCS in the SIB broadcast by an eNB, and/or specified in RRC configuration sent by the eNB to an ICD. In such examples, the eNB disregards SCPPs received from a UE. Instead, the NICDs look to decode a number (e.g., one or more) of these SCPPs on PRACHs in a specified time to thereby infer that secondary coverage is available. In some examples, the PRACHs are transmitted at a particular time offset from the start of the PRACH time resources, in order to provide a consistent timing of the received signal at the NICDs.

Note that the NICDs need not have an accurate notion of UL timing before transmitting the PI. A coarse-grained notion of DL timing suffices. So multiple SCSs received from ICDs (e.g., which may be connected to the same or different eNBs) at different times allows an NICD to pick one or more of the SCS to which to respond. The SCPP, possibly along with some additional parameters, such as the root sequence, may be configured or pre-programmed in NICDs, whose cell search procedure is amended to include searching for the one (or a few) ZC sequences corresponding to the SCPP. Further, another reserved preamble, which is similarly configured in the NICDs and ICDs, may be used as the SCS-R defined above.

In some examples, different ICDs are configured with different SCSs (and/or possibly SCS-Rs) to allow an NICD that receives an SCS to determine a cell (e.g., donor eNB) and/or an ICD to which the NICD prefers to connect to obtain secondary coverage. Such examples may employ a larger set of possible SCS (and possibly SCS-R) signals to be decoded at the NICD, but allow the network to require fewer ICDs to switch to relay mode by providing the NICDs a way to discriminate between the ICDs (e.g., based on signal quality) when requesting a secondary coverage connection. In some examples, the PIs corresponding to the different NICDs are may also be distinct. In some examples, distinct SCSs may be provided to some subsets of ICDs to indicate different classes of secondary coverage.

A consideration in the design of the SCS is that it should be distinguishable from PSS/SSS that is used for primary coverage. This is one reason why the example secondary coverage procedures disclosed herein utilize an SCS that is sent in the UL resources. However, a distinction between the SCS and PSS/SSS may not be an issue at the stage of initial cell search, because legacy UEs are expected to be able to handle the existence of PSS/SSS of cells that may not allow them to camp or RACH. As such, in some examples, the same resources as PSS/SSS may be used for transmitting the SCS (e.g. such as the SCS being transmitted in the DL spectrum of an FDD system). In other examples that are used in a TDD system, or where SCS transmission occurs in DL spectrum of an FDD system, some power consumed in legacy UEs for cell search may be saved by specifying that the SCS is to be located outside the center 6 RBs. Since the NICDs are non-legacy, the frequency resources for such SCS may be pre-programmed or configured.

In some examples, an SRS transmission from the NICD may be used for the PI instead of a PRACH PIP, as disclosed above. The parameters for such an SRS to be used as a PI, which may include the transmit power and the particular sequence (e.g., complex symbol sequence), can be preconfigured in both the NICD and the ICDs. Since the transmit timing of the NICD is based on the SCS, and no time advance like command has been sent to the NICD before its transmission of the PI, the eNB allocates guard time and frequency around the expected PI transmission. Accordingly, in such examples, ICDs may be expected to attempt to decode the PI signal by trying a few possibilities of transmission timing.

Figure 12:
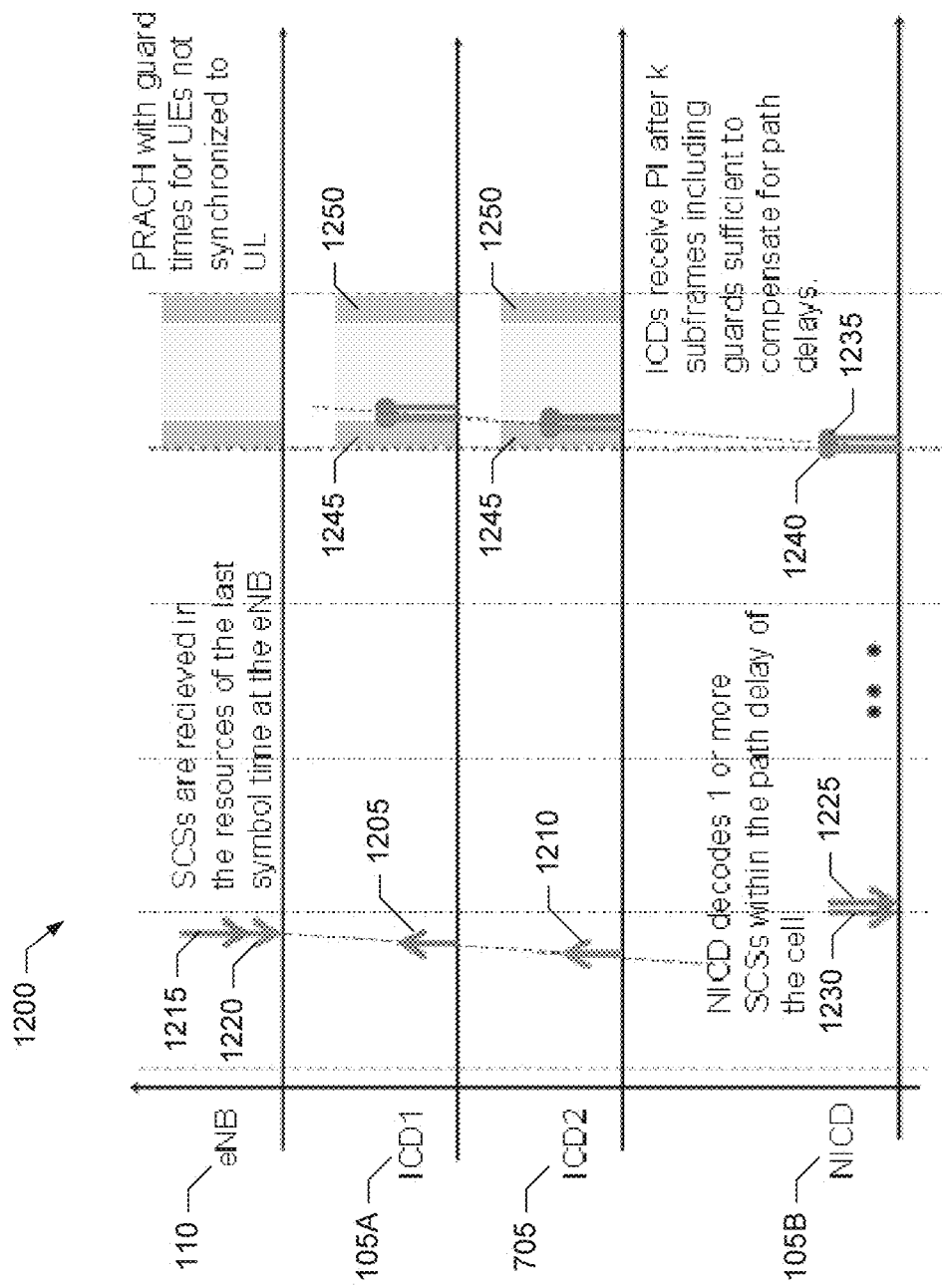
FIG. 12 is a timing diagram illustrating example timing relationships between example secondary coverage signals and associated example presence indicators conveyed in accordance with the second example secondary coverage solution.

FIG. 12 depicts an example timing diagram 1200 illustrating example timing relationships between example SCSs and associated example PIs conveyed in accordance with the second example secondary coverage solution represented by the example message sequence diagram 700 of FIG. 7. In the example timing diagram 1200 of FIG. 2, the example ICD 105A transmits a first example SCS 1205 at a first time, and the example ICD 705 transmits a second example SCS 1210 at a second time. The ICDs 105A and 705 are receiving primary coverage from the example eNB 110 and, thus, the timing of their UL transmissions are aligned with the UL timing of the eNB 110. Accordingly, the SCSs 1205 and 1210 are transmitted by the respective ICDs 105A and 705 at times relative to each other such that the SCSs 1205 and 1210 arrive at the same time at the eNB 110 (which is represented by the respective downward directed arrows 1215 and 1220).

However, the example NICD 105B of FIG. 12 may not be located at the same distances from the respective ICDs 105B and 705 as is the eNB 110. Accordingly, the SCSs 1205 and 1210 may be received by the NICD 105B separated in time by at most the cell's path delay. The reception of the SCSs 1205 and 1210 at the NICD 105B is represented by the respective downward directed arrows 1225 and 1230 in the example timing diagram 1200. In the illustrated example, the NICD 105B transmits respective example PIs 1235 and 1240 in response to receiving the SCSs 1205 and 1210. However, the PIs 1235 and 1240 may be offset due to the corresponding offset between the received SCS signals 1225 and 1230. However, by using UL resources for PI transmission that include guard bands, such as the example PRACH guard bands 1245 and 1250 associated with PRACH transmissions, it is possible to allow for such path delays and accommodate the different times at which the PI transmissions from NICDs may be received at different ICDs, as illustrated in the example timing diagram 1200 of FIG. 12.

While example manners of implementing the example system 100, the example UEs 105A-L, the example access nodes 110 and 110A-D, the example relay node processors 115A-B, the example secondary coverage processors 120A-C, the example in-coverage processor 205 and the example not-in-coverage coverage processor 210 have been illustrated in FIGS. 1-12, one or more of the elements, processes and/or devices illustrated in FIGS. 1-12 may be combined, divided, re-arranged, omitted, eliminated and/or implemented in any other way. Further, the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 of FIGS. 1-12 may be implemented by hardware, software, firmware and/or any combination of hardware, software and/or firmware. Thus, for example, any of the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100, the example UEs 105A-L, the example access nodes 110 and/or 110A-D, the example relay node processors 115A-B, the example secondary coverage processors 120A-C, the example in-coverage processor 205 and the example not-in-coverage coverage processor 210 of FIGS. 1-12 may include one or more elements, processes and/or devices in addition to, or instead of, those illustrated in FIGS. 1-12, and/or may include more than one of any or all of the illustrated elements, processes and devices.

Figure 13:
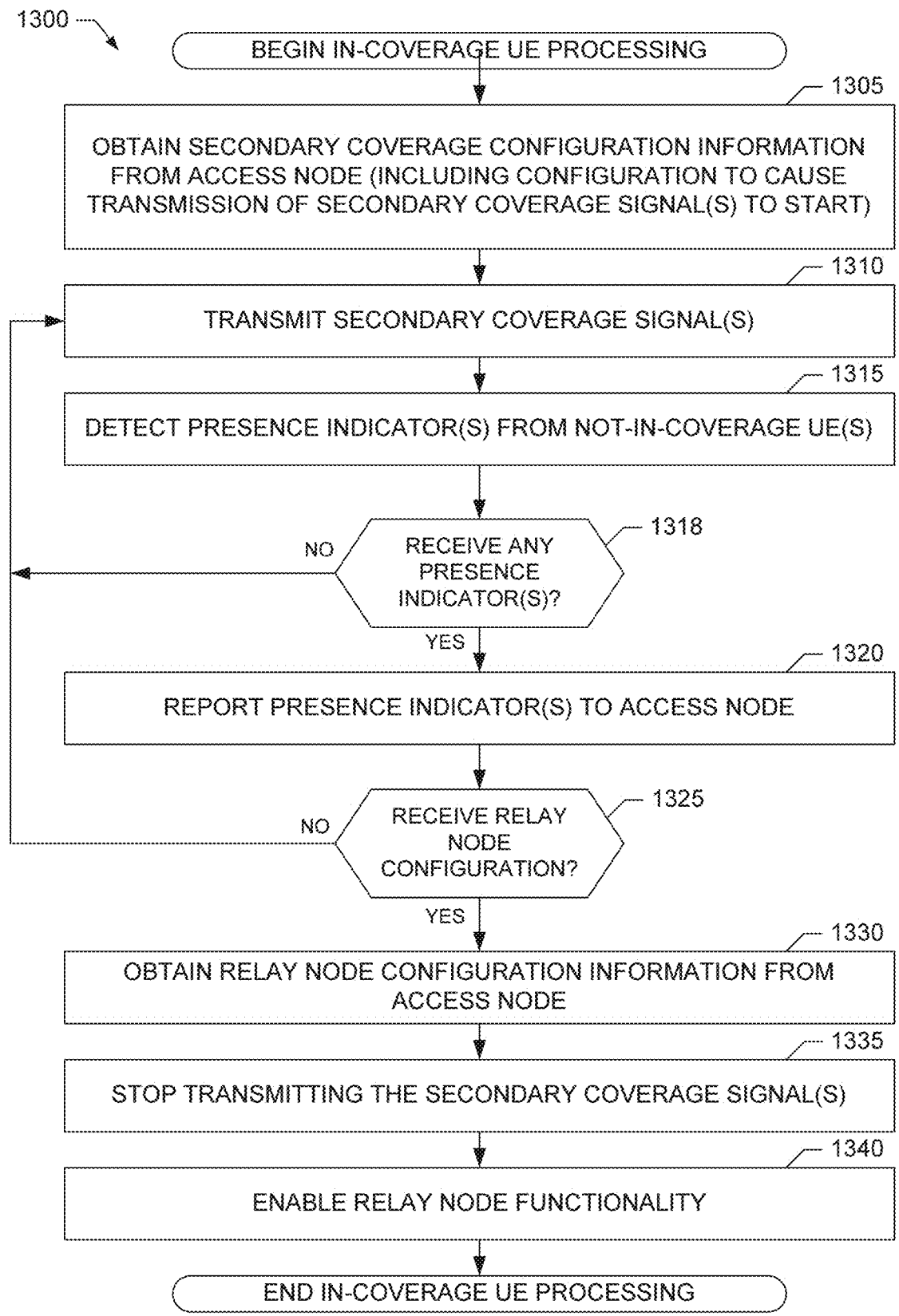
FIG. 13 is a flowchart representative of an example process that may be performed by the example secondary coverage processor of FIG. 2 to implement secondary coverage processing for example in-coverage UE(s) in the example system of FIG. 1.
Figure 14:
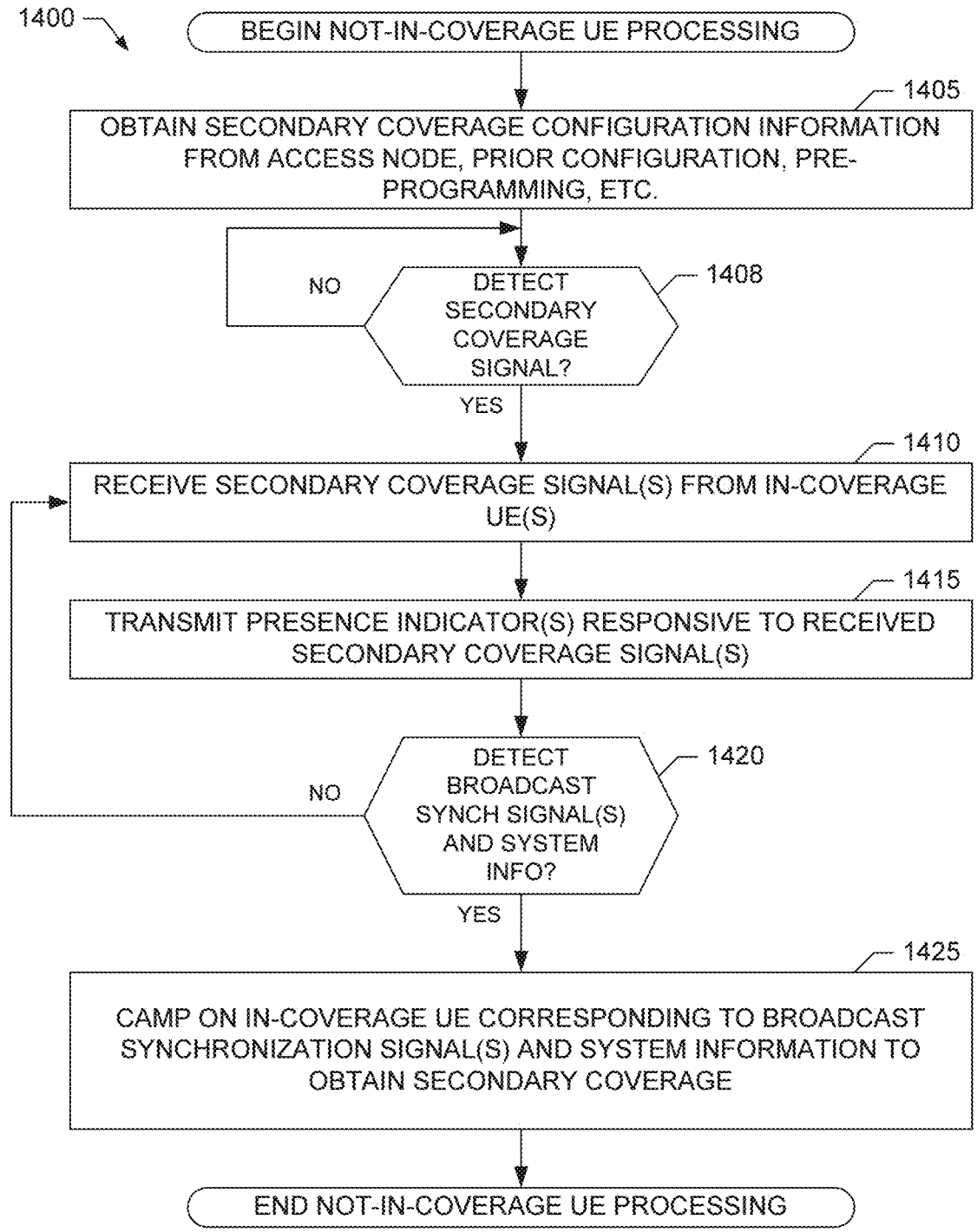
FIG. 14 is a flowchart representative of an example process that may be performed by the example secondary coverage processor of FIG. 2 to implement secondary coverage processing for example not-in-coverage UE(s) in the example system of FIG. 1.
Figure 15:
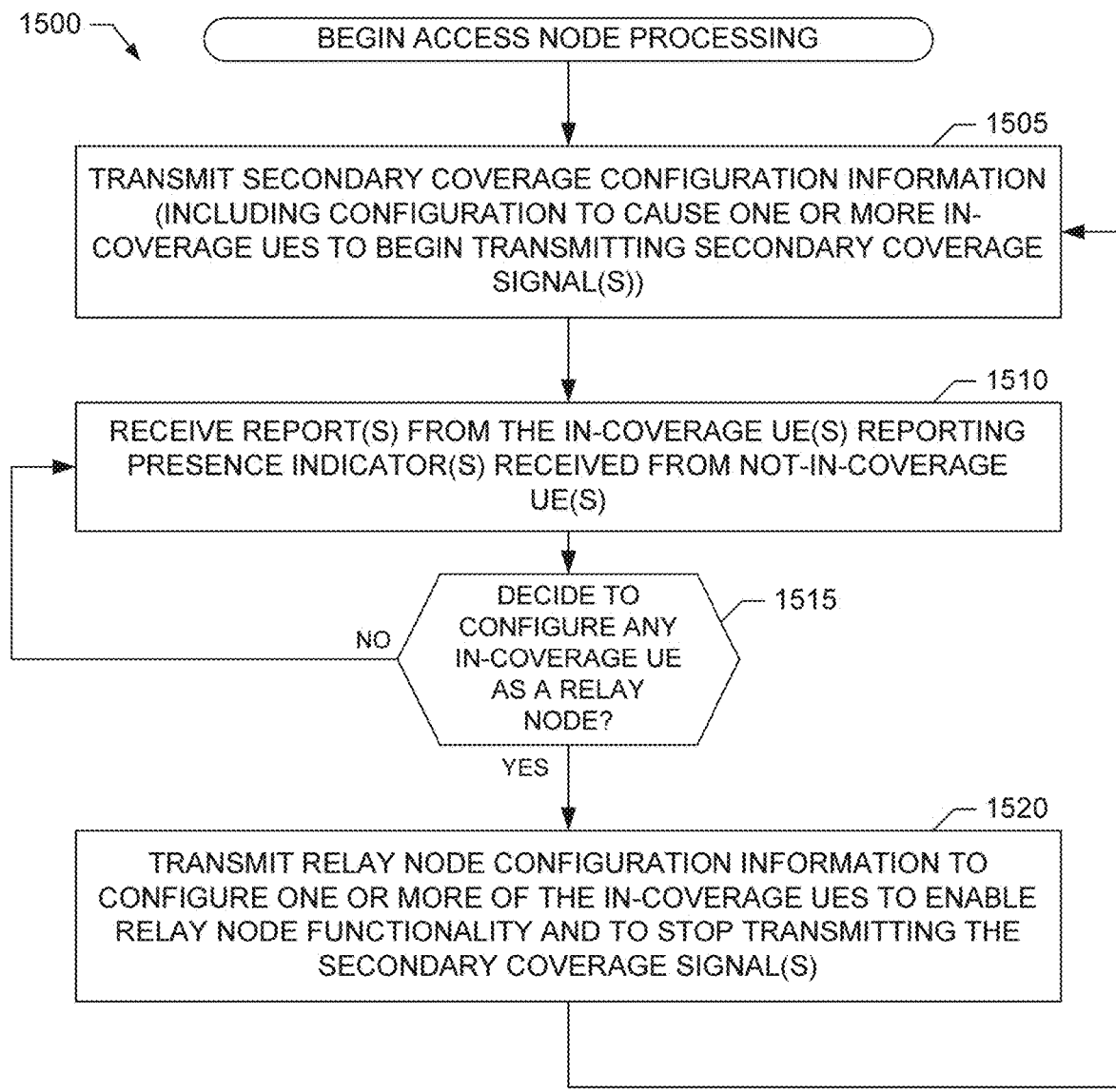
FIG. 15 is a flowchart representative of an example process that may be performed to implement secondary coverage processing for example access node(s) in the example system of FIG. 1.

Flowcharts representative of example processes for implementing the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 of FIGS. 1-12 are shown in FIGS. 13-15. In these examples, the processes may be implemented by one or more programs comprising machine readable instructions for execution by a processor, such as the processor 1612 shown in the example processor platform 1600 discussed below in connection with FIG. 16. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 1612, but the entire program or programs and/or portions thereof could alternatively be executed by a device other than the processor 1612 and/or embodied in firmware or dedicated hardware (e.g., implemented by an ASIC, a PLD, an FPLD, discrete logic, etc.). Also, one or more of the processes represented by the flowcharts of FIGS. 13-15, or one or more portion(s) thereof, may be implemented manually. Further, although the example processes are described with reference to the flowcharts illustrated in FIGS. 13-15, many other methods of implementing the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 may alternatively be used. For example, with reference to the flowcharts illustrated in FIGS. 13-15, the order of execution of the blocks may be changed, and/or some of the blocks described may be changed, eliminated, combined and/or subdivided into multiple blocks.

As mentioned above, the example processes of FIGS. 13-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 13-15 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example process 1300 that may be executed to implement the example in-coverage processor 205 of the example secondary coverage processor 120 of FIG. 2 is illustrated in FIG. 13. As disclosed above, the secondary coverage processor 120 of FIG. 2 may be included in a UE, such as the UEs 105A-C, and the in-coverage processor 205 may be used to implement ICD processing in such a UE. For convenience and without loss of generality, operation of the example process of 1300 is described from the perspective of the secondary coverage processor 120 being included in the example ICD 105A. With reference to the preceding figures and associated written descriptions, the example process 1300 of FIG. 13 begins execution at block 1305 at which the in-coverage processor 205 of the ICD 105A obtains any secondary coverage configuration information, such as any information to configure SCS generation/transmission, SCS-R generation/transmission, PI timing, etc., from a serving access node, such as the eNB 110. The configuration information received at block 1305, or configuration received thereafter, can also instruct the in-coverage processor 205 to cause the ICD 105A to begin transmitting its SCS, as described above.

At block 1310, the in-coverage processor 205 causes the ICD 105A to transition to the lookout mode and begin transmitting its SCS (and SCS-R, if configured) to indicate that the ICD 105A is able to provide secondary coverage, as described above. At block 1315, the in-coverage processor 205 performs PI detection to attempt to detect any PIs that may be received from any NICDs, such as from one or more of the NICDs 105B-C. Such PIs, if detected, may or may not be received in response to the SCS transmission(s) initiated at block 1310, as described above. At block 1318, the in-coverage processor 205 determines whether any PI(s) have been received. If at least one PI was received (block 1318), then at block 1320 the in-coverage processor 205 causes the ICD 105A to report the detection of the PI(s) at block 1315 to the eNB 110 serving the ICD 105A, as described above. Otherwise, processing returns to block 1310.

At block 1325, the in-coverage processor 205 determines whether the ICD 105A has received any relay node configuration from the eNB 110 in response to the PI(s) reported at block 1320. If the ICD 105A has not received any relay node configuration information (block 1325), then the in-coverage processor 205 causes the ICD 105A to continue operating in lookout mode and, thus, processing returns to block 1310 and blocks subsequent thereto. However, if the ICD 105A has received relay node configuration information (block 1325), then at block 1330 the in-coverage processor 205 obtains the relay node configuration information from the eNB 110, as described above. Then, at block 1335, the in-coverage processor 205 causes the ICD 105A to stop its SCS transmissions(s) and exit the lookout mode, and at block 1340, the in-coverage processor 205 causes the relay node processor 115A of the ICD 105A to enable relay node functionality, as described above.

An example process 1400 that may be executed to implement the example not-in-coverage processor 210 of the example secondary coverage processor 120 of FIG. 2 is illustrated in FIG. 14. As disclosed above, the secondary coverage processor 120 of FIG. 2 may be included in a UE, such as the UEs 105A-C, and the not-in-coverage processor 210 may be used to implement NICD processing in such a UE. For convenience and without loss of generality, operation of the example process of 1400 is described from the perspective of the secondary coverage processor 120 being included in the example NICD 105B. With reference to the preceding figures and associated written descriptions, the example process 1400 of FIG. 14 begins execution at block 1405 at which the not-in-coverage processor 210 of the NICD 105B obtains any secondary coverage configuration information, such as any information to configure SCS detection, SCS-R detection, PI generation/transmission, etc., as described above. For example, the configuration information received at block 1405 may be pre-programmed and/or received from an access node at a previous time during which the NICD 105B was connected to the network.

At block 1408, the not-in-coverage processor 210 causes the NICD 105B to perform SCS detection to detect one or more SCS transmissions from one or more ICDs, such as the ICD 105A, as described above. If an SCS is detected (block 1408), then at block 1410 the not-in-coverage processor 210 receives the detected SCS. At block 1415, the not-in-coverage processor 210 causes the NICD 105B to transmit one or more PIs in response to the SCS transmission(s) received at block 1410, as described above. At block 1420, the not-in-coverage processor 210 determines whether the NICD 105B has subsequently detected any broadcasted synchronization signal(s) and/or system information indicative of the presence of a cell. If such information indicative of the presence of a cell is not detected (block 1420), then the not-in-coverage processor 210 causes the NICD 105B to continue attempting to detect SCS transmission(s) from nearby ICD(s) and, thus, processing returns to blocks 1410 and the blocks subsequent thereto. However, information indicative of the presence of a cell is detected (block 1420), then at block 1425 the not-in-coverage processor 210 causes the NICD 105B to camp on the cell associated with the received synchronization signal(s) and/or system information. For example, and as described above, the cell at block 1425 may be implemented by an ICD, such as the ICD 105A, which was configured to operate as a relay node to provide secondary coverage in response to the PI(s) transmitted at block 1415.

An example process 1500 that may be executed to implement the example relay node controller 125 of an example access node, such as the example eNB 110 of FIG. 1, is illustrated in FIG. 15. As disclosed above, the relay node controller 125 is included in an example access node, such as the eNB 110, to control whether relay node functionality is configured in an ICD served by the access node, such as the ICD 105A. For convenience and without loss of generality, operation of the example process of 1500 is described from the perspective of the relay node controller 125 being included in the example eNB 110. With reference to the preceding figures and associated written descriptions, the example process 1500 of FIG. 15 begins execution at block 1505 at which the relay node controller 125 causes the eNB 110 to transmit (e.g., via broadcast signaling, unicast dedicated signaling, etc.) secondary coverage configuration information, such as any information to configure SCS generation/transmission, SCS-R generation/transmission, PI timing, etc., to one or more ICDs, such as the ICD 105A, being served by the eNB 110. The configuration information transmitted at block 1505 also instructs the receiving ICD(s) to enter lookout mode and begin transmitting their respective SCS(s), as described above.

At block 1510, the relay node controller 125 of the eNB 110 receives one or more reports from one or more ICDs, such as the ICD 105A, reporting the detection of one or more PIs from one or more NICDs, such as one or more of the NICDs 105B-C, as described above. At block 1515, the relay node controller 125 evaluates one or more criteria, as described above, to determine whether to configure any ICD associated with a PI report received at block 1510 as a relay node that is to provide secondary coverage. If no ICD is to be configured as a relay node (block 1515), then the relay node controller 125 waits to receive further PI reports from the ICD(s) and, thus, processing returns to block 1510. However, if at least one ICD is to be configured as a relay node (block 1515), then at block 1520 the relay node controller 125 causes the eNB 110 to send relay node configuration to one or more of the ICDs associated with the PI report(s) received at block 1510. For example, and as described above, the relay node configuration sent at block 1520 can cause a receiving ICD to stop its SCS transmissions(s), exit the lookout mode and enable relay node functionality to provide secondary coverage to any NICDs in the vicinity of the ICD, which may or may not include an NICD from which the ICD received a PI.

Figure 16:
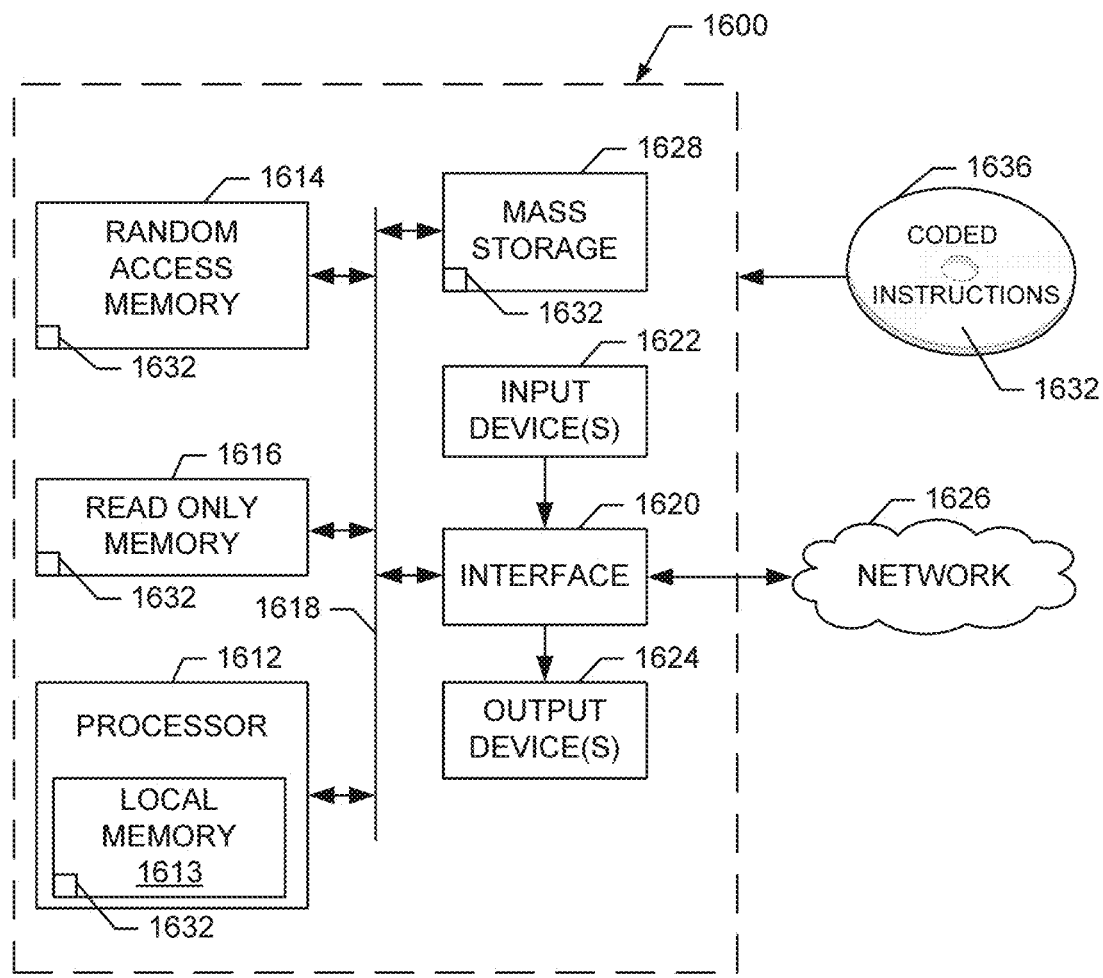
FIG. 16 is a block diagram of an example processor platform that may execute example machine readable instructions used to implement some or all of the processes of FIGS. 13-15 to implement the example system of FIG. 1.

FIG. 16 is a block diagram of an example processor platform 1600 capable of executing the processes of FIGS. 13-15 to implement the example system 100, the example UEs 105A-L, the example access nodes 110 and/or 110A-D, the example relay node processors 115A-B, the example secondary coverage processors 120A-C, the example in-coverage processor 205 and/or the example not-in-coverage coverage processor 210 of FIGS. 1-12. The processor platform 1600 can be, for example, a server, a personal computer, a mobile device (e.g., a cell phone, a smart phone, a tablet), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache) (e.g., a cache). The processor 1612 of the illustrated example is in communication with a main memory including a volatile memory 1614 and a non-volatile memory 1616 via a link 1618. The link 1518 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID (redundant array of independent disks) systems, and digital versatile disk (DVD) drives.

Coded instructions 1632 corresponding to the instructions of FIGS. 13-15 may be stored in the mass storage device 1628, in the volatile memory 1614, in the non-volatile memory 1616, in the local memory 1613 and/or on a removable tangible computer readable storage medium, such as a CD or DVD 1636.

Also, as used herein, the term "node" broadly refers to any connection point, such as a redistribution point or a communication endpoint, of a communication environment, such as a network. Accordingly, such nodes can refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, digital subscriber line (DSL) modems, wireless LAN (WLAN) access points, etc. Examples of Internet or Intranet nodes include host computers identified by an Internet Protocol (IP) address, bridges, WLAN access points, etc. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), Packet Data Network Gateways (PDN-GW), etc.

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, sensors, etc. A server node, as used herein, may refer to an information processing device (e.g., a host computer), or series of information processing devices, that perform information processing requests submitted by other nodes. As used herein, a peer node may sometimes serve as a client node, and at other times, a server node. In a peer-to-peer or overlay network, a node that actively routes data for other networked devices as well as itself may be referred to as a supernode. An access node, as used herein, may refer to a node that provides a client node access to a communication environment. Examples of access nodes include, but are not limited to, cellular network base stations such as evolved Node-Bs (eNBs), wireless broadband (e.g., WiFi, WiMAX, etc) access points, relay nodes, cluster head devices, mobile stations, etc., which provide corresponding cell and/or WLAN coverage areas, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    transmitting, from an access node to a first terminal, secondary coverage configuration information;
    receiving, at the access node and from the first terminal, a presence indication (PI) report of a second terminal;
    determining, at the access node, to configure the first terminal as a relay node based on the PI report; and
    in response to the determining, directing traffic for the second terminal to the first terminal.

2. The method of claim 1, wherein the secondary coverage configuration information comprises at least one of secondary coverage signal (SCS) configuration information, SCS resource signal (SCS-R) configuration information, or PI timing information.

3. The method of claim 1, wherein the secondary coverage configuration information causes the first terminal to transmit SCS.

4. The method of claim 1, wherein the configuring the first terminal as the relay node comprises: transmitting, from the access node to the first terminal, relay node configuration information.

5. The method of claim 4, wherein the relay node configuration information causes the first terminal to stop transmitting SCS.

6. The method of claim 1, wherein the PI report indicates that the first terminal receives a PI from a second terminal.

7. The method of claim 6, wherein the first terminal has primary coverage of the access node, and the second terminal does not have primary coverage of the access node.

8. A device, comprising:
    at least one hardware processor; and
    a non-transitory computer-readable storage medium coupled to the at least one hardware processor and storing programming instructions for execution by the at least one hardware processor, wherein the programming instructions, when executed, cause the at least one hardware processor to perform operations comprising:
    transmitting, from an access node to a first terminal, secondary coverage configuration information;
    receiving, at the access node and from the first terminal, a presence indication (PI) report of a second terminal;
    determining, at the access node, to configure the first terminal as a relay node based on the PI report; and
    in response to the determining, directing traffic for the second terminal to the first terminal.

9. The device of claim 8, wherein the secondary coverage configuration information comprises at least one of secondary coverage signal (SCS) configuration information, SCS resource signal (SCS-R) configuration information, or PI timing information.

10. The device of claim 8, wherein the secondary coverage configuration information causes the first terminal to transmit SCS.

11. The device of claim 8, wherein the configuring the first terminal as the relay node comprises: transmitting, from the access node to the first terminal, relay node configuration information.

12. The device of claim 11, wherein the relay node configuration information causes the first terminal to stop transmitting SCS.

13. The device of claim 8, wherein the PI report indicates that the first terminal receives a PI from a second terminal.

14. The device of claim 13, wherein the first terminal has primary coverage of the access node, and the second terminal does not have primary coverage of the access node.

15. A non-transitory computer-readable medium storing instructions which, when executed, cause a computing device to perform operations comprising:
    transmitting, from an access node to a first terminal, secondary coverage configuration information;
    receiving, at the access node and from the first terminal, a presence indication (PI) report of a second terminal;
    determining, at the access node, to configure the first terminal as a relay node based on the PI report; and
    in response to the determining, directing traffic for the second terminal to the first terminal.

16. The non-transitory computer-readable medium of claim 15, wherein the secondary coverage configuration information comprises at least one of secondary coverage signal (SCS) configuration information, SCS resource signal (SCS-R) configuration information, or PI timing information.

17. The non-transitory computer-readable medium of claim 15, wherein the secondary coverage configuration information causes the first terminal to transmit SCS.

18. The non-transitory computer-readable medium of claim 15, wherein the configuring the first terminal as the relay node comprises: transmitting, from the access node to the first terminal, relay node configuration information.

19. The non-transitory computer-readable medium of claim 18, wherein the relay node configuration information causes the first terminal to stop transmitting SCS.

20. The non-transitory computer-readable medium of claim 15, wherein the PI report indicates that the first terminal receives a PI from a second terminal.

* * * * *